US011728872B2

United States Patent
Sun et al.

(10) Patent No.: US 11,728,872 B2
(45) Date of Patent: Aug. 15, 2023

(54) RANDOM ACCESS WITH BEAM REFINEMENT IN WIRELESS COMMUNICATIONS

(71) Applicant: QUALCOMM Incorporated, San Diego, CA (US)

(72) Inventors: Jing Sun, San Diego, CA (US); Xiaoxia Zhang, San Diego, CA (US); Mahmoud Taherzadeh Boroujeni, San Diego, CA (US); Tao Luo, San Diego, CA (US); Juan Montojo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/214,423

(22) Filed: Mar. 26, 2021

(65) Prior Publication Data

US 2021/0306053 A1    Sep. 30, 2021

Related U.S. Application Data

(60) Provisional application No. 63/002,312, filed on Mar. 30, 2020.

(51) Int. Cl.
| *H04B 7/06* | (2006.01) |
| *H04W 16/28* | (2009.01) |
| *H04W 74/08* | (2009.01) |
| *H04B 17/318* | (2015.01) |
| *H04W 24/08* | (2009.01) |

(Continued)

(52) U.S. Cl.
CPC ......... *H04B 7/0695* (2013.01); *H04B 17/318* (2015.01); *H04W 16/28* (2013.01); *H04W 24/08* (2013.01); *H04W 24/10* (2013.01); *H04W 74/0833* (2013.01); *H04W 76/11* (2018.02)

(58) Field of Classification Search
CPC ..... H04B 7/069; H04B 17/318; H04W 16/28; H04W 24/08; H04W 24/10; H04W 74/0833; H04W 76/11; H04W 74/006
See application file for complete search history.

(56) References Cited

U.S. PATENT DOCUMENTS

| 2018/0124724 A1* | 5/2018 | Tsai | .................. H04W 74/0833 |
| 2019/0052334 A1* | 2/2019 | Jeon | .................. H04W 74/0833 |

(Continued)

*Primary Examiner* — Abdullahi Ahmed
(74) *Attorney, Agent, or Firm* — Holland & Hart LLP

(57) ABSTRACT

Methods, systems, and devices for wireless communications are described in which a base station and a user equipment (UE) may use multiple transmissions associated with a random access procedure to refine a beam that is used for subsequent portions of the access procedure. A UE may transmit a random access request to the base station and, in response thereto, the base station may transmit a control channel order to the UE. The control channel order may indicate that the UE is to transmit a modified random access request to the base station. The base station may monitor for the modified random access request using different beamforming parameters in order to determine a refined beam to be used for a subsequent transmission in the random access procedure. The base station may then use the refined beam to transmit a random access response to the UE, and complete the access procedure.

30 Claims, 17 Drawing Sheets

(51) Int. Cl.
*H04W 24/10* (2009.01)
*H04W 76/11* (2018.01)

(56) References Cited

U.S. PATENT DOCUMENTS

| | | | |
|---|---|---|---|
| 2020/0229241 A1* | 7/2020 | Jeon | H04W 74/0833 |
| 2020/0351955 A1* | 11/2020 | Jeon | H04L 5/0092 |
| 2021/0329691 A1* | 10/2021 | Sun | H04W 74/0833 |
| 2022/0240326 A1* | 7/2022 | Rune | H04W 74/0866 |
| 2022/0295568 A1* | 9/2022 | Hwang | H04W 74/0833 |

* cited by examiner

RANDOM ACCESS WITH BEAM REFINEMENT IN WIRELESS COMMUNICATIONS

CROSS REFERENCE

The present Application for Patent claims the benefit of U.S. Provisional Patent Application No. 63/002,312 by SUN et al., entitled "RANDOM ACCESS WITH BEAM REFINEMENT IN WIRELESS COMMUNICATIONS," filed Mar. 30, 2020, assigned to the assignee hereof, and expressly incorporated by reference herein.

FIELD OF TECHNOLOGY

The following relates generally to wireless communications and more specifically to random access with beam refinement in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a mmW system, a base station and a UE may communicate via one or more directional beams. A transmitter (e.g. a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. Techniques that may provide more efficient beam refinement may be desirable to help enhance network efficiency.

SUMMARY

The described techniques relate to improved methods, systems, devices, and apparatuses that support random access with beam refinement in wireless communications. Various described techniques provide that a base station and a user equipment (UE) may use multiple transmissions associated with an access procedure (e.g., a random access procedure) to refine a beam that is used for subsequent portions of the access procedure. In some cases, a UE may transmit a random access request to the base station and, in response thereto, the base station may transmit a physical downlink control channel (PDCCH) order to the UE. The PDCCH order may indicate that the UE is to transmit one or more modified random access requests to the base station. The base station may monitor for the one or more modified random access requests using different beamforming parameters in order to determine a refined beam to be used for a subsequent transmission in the random access procedure. The base station may then use the refined beam to transmit a random access response to the UE, and complete the access procedure. The refined beam may provide for more reliable reception of the random access response at the UE, and thereby enhance the reliability and efficiency of communications.

A method of wireless communication at a UE is described. The method may include transmitting an initial random access request to a base station to establish a wireless connection with the base station, receiving a control channel order in the form of a control channel transmission from the base station, transmitting one or more modified random access requests to the base station responsive to the control channel order, receiving a random access response from the base station indicating an uplink resource for transmission of a UE identification message, and transmitting the UE identification message to the base station via the indicated uplink resource.

An apparatus for wireless communication at a UE is described. The apparatus may include a processor, memory coupled with the processor, and instructions stored in the memory. The instructions may be executable by the processor to cause the apparatus to transmit an initial random access request to a base station to establish a wireless connection with the base station, receive a control channel order in the form of a control channel transmission from the base station, transmit one or more modified random access requests to the base station responsive to the control channel order, receive a random access response from the base station indicating an uplink resource for transmission of a UE identification message, and transmit the UE identification message to the base station via the indicated uplink resource.

Another apparatus for wireless communication at a UE is described. The apparatus may include means for transmitting an initial random access request to a base station to establish a wireless connection with the base station, receiving a control channel order in the form of a control channel transmission from the base station, transmitting one or more modified random access requests to the base station responsive to the control channel order, receiving a random access response from the base station indicating an uplink resource for transmission of a UE identification message, and transmitting the UE identification message to the base station via the indicated uplink resource.

A non-transitory computer-readable medium storing code for wireless communication at a UE is described. The code may include instructions executable by a processor to transmit an initial random access request to a base station to establish a wireless connection with the base station, receive a control channel order in the form of a control channel transmission from the base station, transmit one or more modified random access requests to the base station responsive to the control channel order, receive a random access response from the base station indicating an uplink resource for transmission of a UE identification message, and transmit the UE identification message to the base station via the indicated uplink resource.

In some examples of the method, apparatuses, and non-transitory computer-readable medium described herein, the receiving the control channel order may include operations, features, means, or instructions for monitoring for a control channel message that is scrambled with a random access temporary identifier that corresponds to the initial random access request. In some examples of the method, apparatuses, and non-transitory computer-readable medium described herein, the control channel order indicates a preamble index associated with a random access preamble, and where the UE disregards the control channel order when the preamble index does not correspond to a preamble of the initial random access request. Some examples of the method, apparatuses, and non-transitory computer-readable medium described herein may further include operations, features, means, or instructions for determining, based on the control channel order, uplink resources for the one or more modified random access requests.

In some examples of the method, apparatuses, and non-transitory computer-readable medium described herein, the receiving the control channel order may include operations, features, means, or instructions for performing a blind decoding procedure in a common search space based on the initial random access request. Some examples of the method, apparatuses, and non-transitory computer-readable medium described herein may further include operations, features, means, or instructions for receiving, prior to receiving the random access response, a second control channel order from the base station, and transmitting, responsive to the second control channel order, a second instance of one or more modified random access requests to the base station.

In some examples of the method, apparatuses, and non-transitory computer-readable medium described herein, the receiving the control channel order further may include operations, features, means, or instructions for monitoring for the control channel order using a receive beam that is associated with a synchronization signal block received from the base station, and where the control channel order has a higher coding gain than a control channel transmission granting the random access response due to smaller payload size. In some examples of the method, apparatuses, and non-transitory computer-readable medium described herein, the modified random access request includes one or more repetitions of a preamble sequence of the initial random access request and uses an uplink resource that is indicated by the control channel order. In some examples of the method, apparatuses, and non-transitory computer-readable medium described herein, each of the one or more repetitions is an abbreviated version of the initial random access request.

Some examples of the method, apparatuses, and non-transitory computer-readable medium described herein may further include operations, features, means, or instructions for identifying a first random access occasion for transmitting the initial random access request from a set of random access occasions, where using the first random access occasion indicates that the UE is to monitor for the control channel order for beam refinement during random access, and where a random access request transmitted using a second random access occasion of the set of random access occasions indicates that the UE is to monitor for the random access response without monitoring for the control channel order.

Some examples of the method, apparatuses, and non-transitory computer-readable medium described herein may further include operations, features, means, or instructions for selecting the first random access occasion based on a measurement of one or more channel characteristics of a transmission from the base station. In some examples of the method, apparatuses, and non-transitory computer-readable medium described herein, the first random access occasion is selected based on a measured reference signal strength from the base station being below a signal strength threshold value. In some examples of the method, apparatuses, and non-transitory computer-readable medium described herein, the first random access occasion is selected based on one or more other random access request transmissions using the second random access occasion having a transmission power that exceeds a power threshold value.

In some examples of the method, apparatuses, and non-transitory computer-readable medium described herein, the receiving the control channel order further may include operations, features, means, or instructions for monitoring for the control channel order during a random access response window that is associated with the initial random access request, and where the random access response window is reset responsive to transmitting the modified random access request. In some examples of the method, apparatuses, and non-transitory computer-readable medium described herein, the receiving the control channel order further may include operations, features, means, or instructions for monitoring for the control channel order during a random access response window that is configured by the base station.

In some examples of the method, apparatuses, and non-transitory computer-readable medium described herein, the receiving the control channel order further may include operations, features, means, or instructions for monitoring for the control channel order during a random access response window, where a duration of the random access response window is determined based on a random access occasion used to transmit the initial random access request, a random access preamble of the initial random access request, or any combinations thereof.

A method of wireless communication at a base station is described. The method may include receiving, from a UE, an initial random access request to establish a wireless connection with the base station, transmitting, to the UE, a control channel order in the form of a control channel transmission, performing a beam refinement procedure based on measurements of one or more modified random access requests received from the UE, transmitting a random access response to the UE using a refined transmit beam that is determined based on the beam refinement procedure, the random access response indicating an uplink resource for transmission of a UE identification message, and receiving the UE identification message from the UE via the indicated uplink resource.

An apparatus for wireless communication at a base station is described. The apparatus may include a processor, memory coupled with the processor, and instructions stored in the memory. The instructions may be executable by the processor to cause the apparatus to receive, from a UE, an initial random access request to establish a wireless connection with the base station, transmit, to the UE, a control channel order in the form of a control channel transmission, perform a beam refinement procedure based on measurements of one or more modified random access requests received from the UE, transmit a random access response to the UE using a refined transmit beam that is determined based on the beam refinement procedure, the random access response indicating an uplink resource for transmission of a UE identification message, and receive the UE identification message from the UE via the indicated uplink resource.

Another apparatus for wireless communication at a base station is described. The apparatus may include means for receiving, from a UE, an initial random access request to establish a wireless connection with the base station, transmitting, to the UE, a control channel order in the form of a control channel transmission, performing a beam refinement procedure based on measurements of one or more modified random access requests received from the UE, transmitting a random access response to the UE using a refined transmit beam that is determined based on the beam refinement procedure, the random access response indicating an uplink resource for transmission of a UE identification message, and receiving the UE identification message from the UE via the indicated uplink resource.

A non-transitory computer-readable medium storing code for wireless communication at a base station is described. The code may include instructions executable by a processor to receive, from a UE, an initial random access request to establish a wireless connection with the base station, transmit, to the UE, a control channel order in the form of a control channel transmission, perform a beam refinement procedure based on measurements of one or more modified random access requests received from the UE, transmit a random access response to the UE using a refined transmit beam that is determined based on the beam refinement procedure, the random access response indicating an uplink resource for transmission of a UE identification message, and receive the UE identification message from the UE via the indicated uplink resource.

In some examples of the method, apparatuses, and non-transitory computer-readable medium described herein, the transmitting the control channel order further may include operations, features, means, or instructions for scrambling a control channel message with a random access temporary identifier that corresponds to the initial random access request. In some examples of the method, apparatuses, and non-transitory computer-readable medium described herein, the control channel order indicates uplink resources for the one or more modified random access requests.

Some examples of the method, apparatuses, and non-transitory computer-readable medium described herein may further include operations, features, means, or instructions for transmitting, responsive to the modified random access request, a second control channel order to the UE, and where the beam refinement procedure is further based on measurements of a second modified random access request received from the UE responsive to the second control channel order. In some examples of the method, apparatuses, and non-transitory computer-readable medium described herein, the control channel order has a higher coding gain than the control channel transmission granting the random access response due to a smaller payload size. In some examples of the method, apparatuses, and non-transitory computer-readable medium described herein, the control channel order is transmitted using a beam that corresponds to a synchronization signal block that is transmitted by the base station.

In some examples of the method, apparatuses, and non-transitory computer-readable medium described herein, the transmitting the control channel order may include operations, features, means, or instructions for transmitting a first control channel order using a first beam, transmitting, responsive to not detecting the modified random access request subsequent to the first control channel order, a second control channel order using a second beam, where the modified random access request is received from the UE responsive to the second control channel order, and selecting the second beam as the refined transmit beam. In some examples of the method, apparatuses, and non-transitory computer-readable medium described herein, the modified random access request includes one or more repetitions of a preamble sequence of the initial random access request and uses an uplink resource that is indicated by the control channel order. In some examples of the method, apparatuses, and non-transitory computer-readable medium described herein, each of the one or more repetitions is an abbreviated version of the initial random access request.

In some examples of the method, apparatuses, and non-transitory computer-readable medium described herein, the performing the beam refinement procedure may include operations, features, means, or instructions for measuring a first signal strength of the modified random access response using a first receive beam and a second signal strength of the modified random access response using a second receive beam, and selecting the refined transmit beam based on the first signal strength and the second signal strength.

Some examples of the method, apparatuses, and non-transitory computer-readable medium described herein may further include operations, features, means, or instructions for configuring a set of random access occasions for two or more different types of random access, the set of random access occasions including a first random access occasion that is configured to provide for beam refinement during random access through the control channel order and the modified random access request, and a second random access occasion that is configured for random access without beam refinement through transmission of the random access response without transmitting the control channel order or measurements of one or more modified random access requests.

In some examples of the method, apparatuses, and non-transitory computer-readable medium described herein, a random access response window that is associated with the initial random access request is reset responsive to receiving the modified random access request. Some examples of the method, apparatuses, and non-transitory computer-readable medium described herein may further include operations, features, means, or instructions for configuring a random access response window duration that is to be used at the UE for monitoring for the control channel order and the random access response. In some examples of the method, apparatuses, and non-transitory computer-readable medium described herein, a random access response window that is associated with the initial random access request is determined based on a random access occasion used to transmit the initial random access request, a random access preamble of the initial random access request, or any combinations thereof.

DETAILED DESCRIPTION

Figure 1:
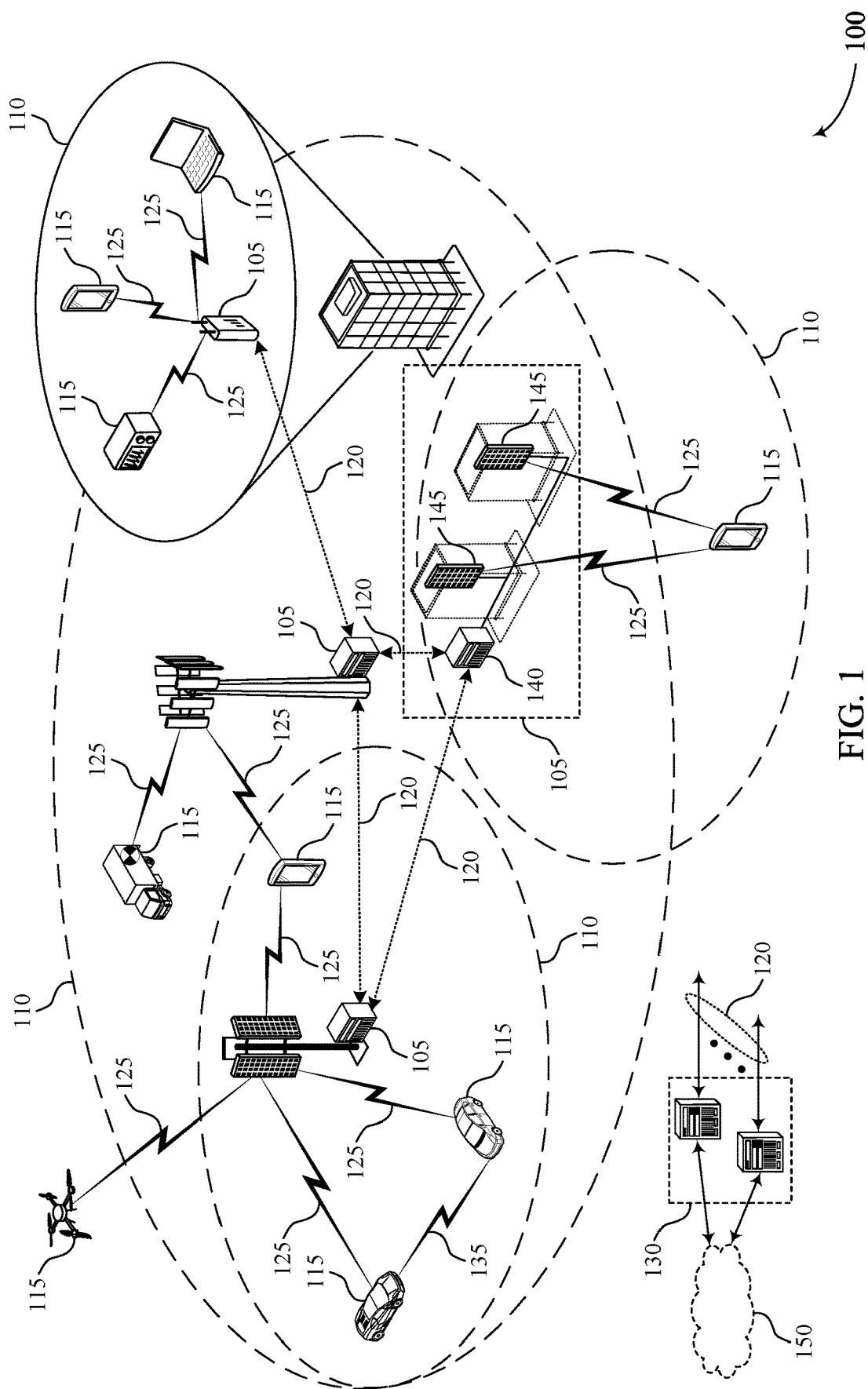
FIG. 1 illustrates an example of a system for wireless communications that supports random access with beam refinement in wireless communications in accordance with aspects of the present disclosure.

Various described techniques provide for refinement of beamforming parameters as part of a random access procedure. In some cases, a base station and a user equipment (UE) may use multiple transmissions associated with an access procedure (e.g., a random access procedure for initial access between the UE and base station) to refine a beam that is used for subsequent portions of the access procedure. In some cases, the UE may transmit a random access request to the base station and, in response thereto, the base station may transmit a physical downlink control channel (PDCCH) order to the UE. The PDCCH order may indicate that the UE is to transmit one or more modified random access requests to the base station. The base station may monitor for the one or more modified random access requests using different beamforming parameters in order to determine a refined beam to be used for a subsequent transmission in the random access procedure. The base station may then use the refined beam to transmit a random access response to the UE, and complete the access procedure.

In some cases, such techniques may be used in millimeter wave (mmW) systems where a base station and UE may communicate via one or more directional beams, and a base station may engage in a beam sweeping operation when transmitting synchronization signal blocks (SSBs) that are detected at UEs and used to identify random access resources for an initial access procedure and establish an active transmit beam for communications. In some cases, the base station, as part of the beam sweep procedure, may perform a sector sweep with wide-formed, lower gain beams that may be transmitted to a particular sector or geographic area in a SSB, and then a subsequent beam may be transmitted to another sector or geographic area in a subsequent SSB. In some cases, each SSB has associated uplink resources, and a UE may transmit an uplink transmission, such as a random access request using a random access channel (RACH) in the uplink resources associated with the SSB in which the UE received the strongest downlink beam. Thus, the different uplink resources associated with different beams in a beam sweeping procedure may provide a time resource partition, and the UE transmission in a particular uplink resource may provide feedback to the base station of the wide-formed beam that the UE received with the highest gain, for example.

In some existing systems, initial access procedures such as RACH procedures may provide that a UE acquires a cell by reading SSB and a system information block (e.g., SIB1), where the system information block provides initial access related parameters. The UE may then transmit a random access request, which may be referred to as a message-1 or MSG1. In some cases, the RACH procedure may use open-loop power control in which the UE may transmit MSG1 at an initial power level and monitor for a response, and then incrementally increase the power level in one or more subsequent transmissions of MSG1 until a random access response is detected from the base station. The base station, upon detection of MSG1, transmits a random access response, which may be referred to as message-2 or MSG2, which may include PDCCH and physical downlink shared channel (PDSCH) portions. In some cases, the PDCCH may be scrambled with random access radio network temporary identifier (RA-RNTI) which is a function of the random access occasion (RO) that the UE used to send MSG1 (e.g., based on a best detected SSB at the UE). Within the PDSCH portion, a medium access control (MAC) control element (CE) may acknowledge the reception of MSG1 and grant the UE an uplink grant to send a message-3 (MSG3) that may include a UE identification. The UE may monitor for PDCCH communications (e.g., downlink control formation (DCI) format 1_0) that are scrambled with the RA-RNTI that corresponds to the RO the UE used to transmit MSG1 and, if detected, proceed with PDSCH decoding. If the MAC-CE is found in the PDSCH, adding to a random access preamble the UE used to send MSG1, the UE will treat this MAC-CE as for itself and follow the UL grant to send its UE-ID in MSG3. In the event of a collision from multiple UEs (e.g., if they used the same preamble sequence in the same RO for sending MSG1) that each send the MSG3 at the same resource, the base station may identify the collision and perform contention resolution, followed by a transmission of an uplink grant in a message-4 (MSG4) from the base station.

In cases where communications use mmW frequencies, the SSB, as indicated above, may be transmitted with a relatively wide beam (e.g., given a limitation of 64 beams supportable in a cell), while a final serving beam to a UE can be narrower with a higher beamforming gain. In some systems, the bottleneck of the initial access process may be related to the random access response (MSG2) transmission, where the UE may not detect the MSG2 transmission from the base station, which may result in inefficiencies due to the UE continuing to transmit higher-power MSG1 transmissions or attempting a new initial access procedure altogether. Such a bottleneck related to MSG2 may result from the base station using the same transmit beam for MSG2 as was used for the associated SSB, which may have relatively low beamforming gain. Further, MSG2 transmissions do not have acknowledgment feedback (e.g., hybrid automatic repeat request (HARM) feedback) to indicate to the base station whether the transmission was successfully received or not, and thus the base station may not be aware that the UE did not receive MSG2.

Techniques as discussed herein allow for UEs to transmit one or more additional signals as part of the random access process, which may be measured at the base station using different receive beamforming parameters in order to refine a beam that is used to transmit MSG2. In some cases, the base station may transmit a PDCCH order in response to receiving a random access request, which may trigger the UE to transmit one or more modified random access requests using a same transmission beam, which may allow the base station to perform beam refinement. Given beam correspondence, the refined receive beam may be used as refined transmit beam for MSG2 transmission. By using a PDCCH order, the UE does not unnecessarily transmit the modified random access request(s), and thus resources can be conserved. Further, such a PDCCH order may have a higher likelihood of reception at the UE than a regular MSG2 transmission, as the order may have a relatively small payload and may thus have a relatively large coding gain as compared to a regular MSG2, which can compensate for a relatively low beamforming gain.

In some cases, the PDCCH order may be monitored for by the UE, in addition to monitoring for a MSG2. The PDCCH order may be scrambled by a RA-RNTI that may be monitored for by the UE, in a similar manner as a MSG2 PDCCH, and the PDCCH order may carry the preamble index to confirm which UE should follow. In some cases, the PDCCH order may indicate a resource for a beam refinement signal transmission, or multiple resources for multiple beam refinement signal transmissions. In some cases, multiple rounds of PDCCH order and beam refinement signals can be supported. As used herein, a PDCCH order may be referred to as a control channel order, a compressed PDCCH order, or a MSG2', and the beam refinement signal maybe referred to as a modified random access request or MSG1'. In some cases, a same common search space may be used by the UE for monitoring of the PDCCH order as may be used for monitoring for regular MSG2. Thus, in such cases, blind decoding at the UE will double, while the number of control channel elements (CCEs) for channel estimation remain the same (due to the PDCCH order decoding candidates overlapping with normal MSG2 PDCCH monitoring). In some cases, a random access request window may be adjusted when a PDCCH order is provided to the UE, to allow for the window to be extended or reset in order to monitor for the regular MSG2 subsequent to the MSG2' transmission.

Providing such beam refinement during an access procedure may provide for more reliable network access procedures. For example, beam refinement based on one or more modified random access requests, in response to a PDCCH order, may enhance likelihood of reception of the random access response at the UE. Such techniques may thus allow for more efficient and reliable access, and thereby enhance the reliability and efficiency of the associated wireless communications network. Further, techniques as discussed herein may reduce a number of downlink and uplink transmissions, and thereby reduce power consumption at a UE, for example. Additionally, in cases where mmW transmissions use a shared or unlicensed frequency spectrum band, a reduced number of transmissions between a UE and a base station is beneficial because it reduces the likelihood that an access procedure will be interrupted in the event that a different transmitter obtains the wireless channel.

Aspects of the disclosure are initially described in the context of wireless communications systems. Examples of uplink and downlink communications, and modified access requests, are then discussed. Aspects of the disclosure are further illustrated by and described with reference to apparatus diagrams, system diagrams, and flowcharts that relate to random access with beam refinement in wireless communications.

FIG. 1 illustrates an example of a wireless communications system 100 that supports random access with beam refinement in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, in accordance with various techniques as discussed herein, when performing an initial access procedure, a base station 105 and a UE 115 may use multiple transmissions to refine a beam that is used for subsequent portions of the access procedure. In some cases, a UE 115 may transmit a random access request to a base station 105 and, in response thereto, the base station 105 may transmit a PDCCH order to the UE 115. The PDCCH order may indicate that the UE 115 is to transmit one or more modified random access requests to the base station 105. The base station 105 may monitor for the one or more modified random access requests using different beamforming parameters in order to determine a refined beam to be used for a subsequent transmission (e.g., a MSG2 or MSG4 transmission) in the random access procedure. The base station 105 may then use the refined beam to transmit a random access response to the UE 115, and complete the access procedure. The refined beam may provide for more reliable reception of the random access response at the UE 115, and thereby enhance the reliability and efficiency of communications.

Figure 2:
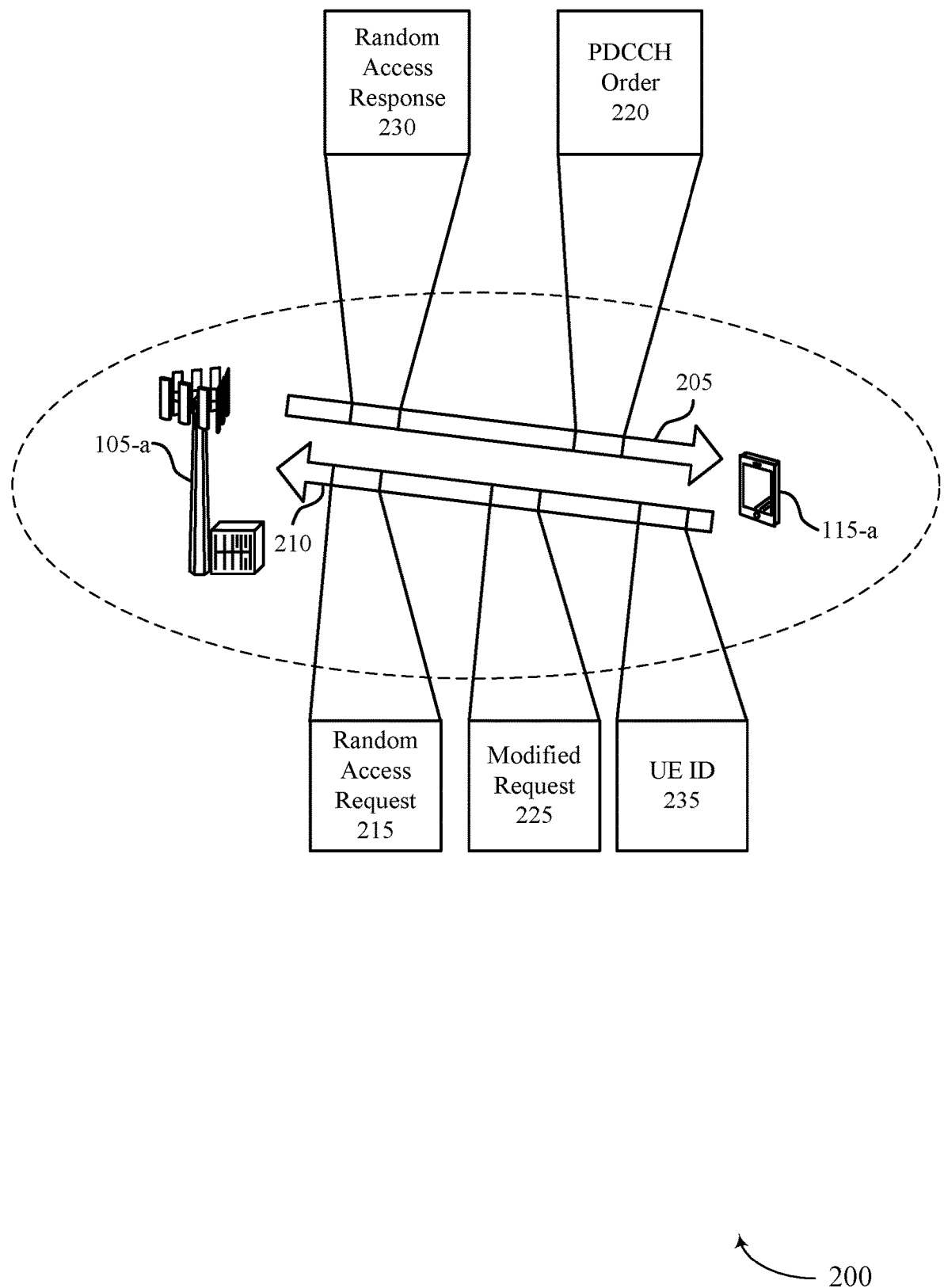
FIG. 2 illustrates an example of a portion of a wireless communications system that supports random access with beam refinement in wireless communications in accordance with aspects of the present disclosure.

FIG. 2 illustrates an example of a wireless communications system 200 that supports random access with beam refinement in wireless communications in accordance with aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1. Base station 105-*a* and UE 115-*a* may communicate using one or more directional beams. In wireless communications system 200, a transmitter (e.g., base station 105-*a*) may engage in a beam sweeping operation to establish an active beam pair link with a receiver (e.g., UE 115-*a*) that may be used for downlink communications 205 and uplink communications 210.

In some examples, base station 105-*a* may engage in a beam sweeping operation to establish an active transmit beam with UE 115-*a*. For example, base station 105-*a* may transmit relatively wide-formed beams, that may be transmitted towards different sectors or geographic directions. In some cases, each wide-formed beam may be associated with an SSB in which synchronization signals (e.g. a primary synchronization signal (PSS) and a secondary synchronization signal (SSS)) and physical broadcast channel (PBCH) transmissions may be transmitted in the corresponding beam direction. In some cases, wide-formed beams may not be narrow enough or have enough beamforming gain to provide for reliable communications between the UE 115-*a* and base station 105-*a*, and using such a relatively wide beam for a random access response may not result in a successful reception at the UE 115-*a*. Therefore, it may be beneficial for base station 105-*a* and UE 115-*a* to use beam refinement to generate a narrower beamformed signal that may be used to communicate a random access response, which may have a narrower coverage area but higher gain.

In some cases, the SSB may indicate an uplink transmission resource that UE 115-*a* may use for a random access transmission (e.g., an uplink resource associated with an SSB). In some cases, the base station 105-*a* may provide other information (e.g., a subset of RACH resources and/or preamble indices) that may be configured by a set of parameters in a master information block (MIB), system information block (SIB), remaining minimum system information (RMSI), or combinations thereof. In some cases, the random access transmission may be a random access request 215 (e.g., a RACH message-1 (MSG1)) that may indicate that the UE 115-*a* has uplink data to transmit or that the UE 115-*a* desires to establish a connection with the base station 105-*a*.

In accordance with various aspects of the present disclosure, the base station 105-*a* may receive the random access request 215 and determine to transmit a PDCCH order 220, which may be an example of a control channel order as discussed herein. In some cases, the PDCCH order 220 is a compressed PDCCH order relative to PDCCH orders that are used in existing deployments that are used to trigger a connected mode UE to send a random access request for a handoff or for timing advance recovery (e.g., based on a DCI 1_0 scrambled with C-RNTI (identified by all 0 FDRA)). Such existing PDCCH orders may have redundant fields to allow alignment with a normal DCI 1_0 to avoid the UE decoding a different DCI length.

As indicated, PDCCH order 220 may be a compressed order that is scrambled by RA-RNTI, in a same manner as a regular MSG2 PDCCH, but that is substantially shorter in length and can therefore have higher coding gain to compensate for the lack of beamforming gain. In some cases, the PDCCH order may carry the preamble index used in the random access request 215, to confirm that UE 115-*a* should follow the PDCCH order 220, and may indicate the resource (s) for one or more beam refinement signal transmissions by the UE 115-*a* in one or more modified requests 225. In some cases, multiple rounds of PDCCH orders 220 and modified request 225 beam refinement signals can be supported. In various examples as discussed herein, the PDCCH order 220 may be referred to as a compressed PDCCH order or simply as a MSG2', and the modified request 225 may be referred to as a beam refinement signal or simply as a MSG1'. The UE 115-*a*, after transmitting the random access request 215, may monitor for the PDCCH order 220 in addition to monitoring for a random access response 230, using a same common search space (e.g., a common search space associated with a SSB that corresponds to the RACH resource used for the random access request 215).

The base station 105-*a*, after transmitting the PDCCH order 220, may monitor for the modified request 225 at the identified uplink resources, using one or more relatively narrow beams that are narrower than a beam associated with the SSB, and identify a refined beam based on the monitoring. The refined beam may then be used by the base station 105-*a* to transmit the random access response 230 to the UE 115-*a*. As the random access response 230 is transmitted using the refined beam, the UE 115-*a* thus has a higher likelihood of successfully receiving the random access response 230. Accordingly, such techniques may enhance network efficiency and reliability by providing faster and more reliable initial access procedures. The UE 115-*a*, after decoding the random access response 230, may transmit a UE identification 235 in a MSG3 transmission, and the random access procedure may proceed in accordance with established random access techniques to complete a connection establishment between the UE 115-*a* and the base station 105-*a*. As indicated herein, the PDCCH order 220 may be a compressed version of an existing PDCCH order, and Table 1 provides an exemplary list of fields with content of the PDCCH order 220, as compared to a legacy PDCCH order.

TABLE 1

| Legacy PDCCH order field | Compressed PDCCH order field |
| --- | --- |
| Identifier for DCI format (1 bit): Used to differentiate DL and UL grant | Not needed, as there is no UL grant at this length |
| FDRA (variable length): Set to all 1 | Not needed |
| PRACH index (6 bits): | PRACH index (but may be fewer than 6 bits) |
| UL/SUL indicator (1 bit) | Not needed |
| SS/PBCH index (6 bits) | Not needed |
| PRACH mask index (4 bits) | Index value that indicates the resource(s) for beam refinement signal(s) |
| Reserved bits (12/10 bits)1 | Not needed |
| CRC (24 bits): Scrambled by C-RNTI | CRC scrambled with RA-RNTI, may be fewer than 24 bits, as the reliability of this DCI is not so critical |

In some cases, the base station 105-*a* may select the beam to use to transmit the PDCCH order 220 as the same beam used for the associated SSB. In such cases, coding gain from the relatively short PDCCH order 220 (relative to a regular MSG2) may compensate for the lack of beamforming gain, and thus provide higher likelihood of successful decoding at the UE 115-*a*.

In other cases, the base station 105-*a* may transmit two or more PDCCH orders 220 using different refined beams, to add beamforming gain on top of the coding gain to have better coverage. In such cases, the refined beam may be wrong, and the UE 115-*a* cannot detect it and cannot send a modified request 225. The base station 105-*a*, based on not detecting the modified request 225, may try a different refined beam, and the process may repeat until a response from the UE 115-*a* is detected. In cases where refined beams are used for the PDCCH order 220, the base station 105-*a* may sweep PDCCH orders 220 in different beams in a manner that the multiple transmissions allow for receipt of the modified request 225 before the end of a monitoring window at the UE 115-*a* for detection of MSG2.

In some cases, the UE 115-*a* may provide an indication to the base station 105-*a* that it supports monitoring for PDCCH orders 220 and can transmit modified requests 225 for beam refinement. In some cases, the base station 105-*a* may configure different random access occasions, and UEs that support random access beam refinement may use a first subset of random access occasions and UEs that do not support such beam refinement or that do not need beam refinement (e.g., in cases where a received power of a SSB from the base station 105-*a* at the UE 115-*a* may exceed a threshold value) may use a second subset of random access occasions. In other cases, support for PDCCH order monitoring may be indicated based on a random access preamble that is selected from the random access request 215 (e.g., a first subset of preambles may be configured to indicate UE capability to engage in beam refinement during random access and a second subset of preambles may indicate legacy behavior is to be used). In some cases, the UE 115-*a* may switch between MSG2' monitoring and MSG1' transmission and the legacy behavior based on one or more conditions. For example, if the UE 115-*a* (e.g., based on downlink signal measurement), determines that it is near a cell center, it can use legacy behavior and use a first pool of resources or preambles for MSG1 without MSG2' monitoring. On the other hand, if the UE 115-*a* determines that is at the edge of cell coverage or otherwise has relatively poor channel conditions, it can use a second pool of resources or preambles that allows the base station 105-*a* to send MSG2' to refine beams. In other cases, the UE 15-*a* may use the first pool of resources or preambles when the MSG1 transmit power is not reaching a relatively high level (e.g., based on open loop power control techniques for random access) and switch to the second pool of resources or preambles when the MSG1 transmit power UE reaches or nears its maximum transmit power.

In some cases, the monitoring window for detection of MSG2 or MSG2' at the UE 115-*a* may be configured in a similar manner as for detection of only MSG2 (e.g., a random access response (RAR) window). In some cases, the UE 115-*a*, upon detection of PDCCH order 220, may transmit the modified request 225 and reset the RAR window to continue to monitor for the random access response 230 or another PDCCH order 220. In other cases, a new window may be configured (e.g., a new RRC configured window), which may be used to for monitoring following transmission of the modified request 225. Additionally or alternatively, the RAR window may be extended (e.g., up to 40 ms) to accommodate transmission of one or more PDCCH orders. Thus, in some cases, the base station 105-*a* may configure a separate RAR window (i.e., a longer window) for UEs such as UE 115-*a* that support monitoring for a PDCCH order 220, and the UEs may use this different window when using a random access occasion, or a random access preamble from a set of preambles, that indicates that the UE supports monitoring for a PDCCH order 220.

Figure 3:
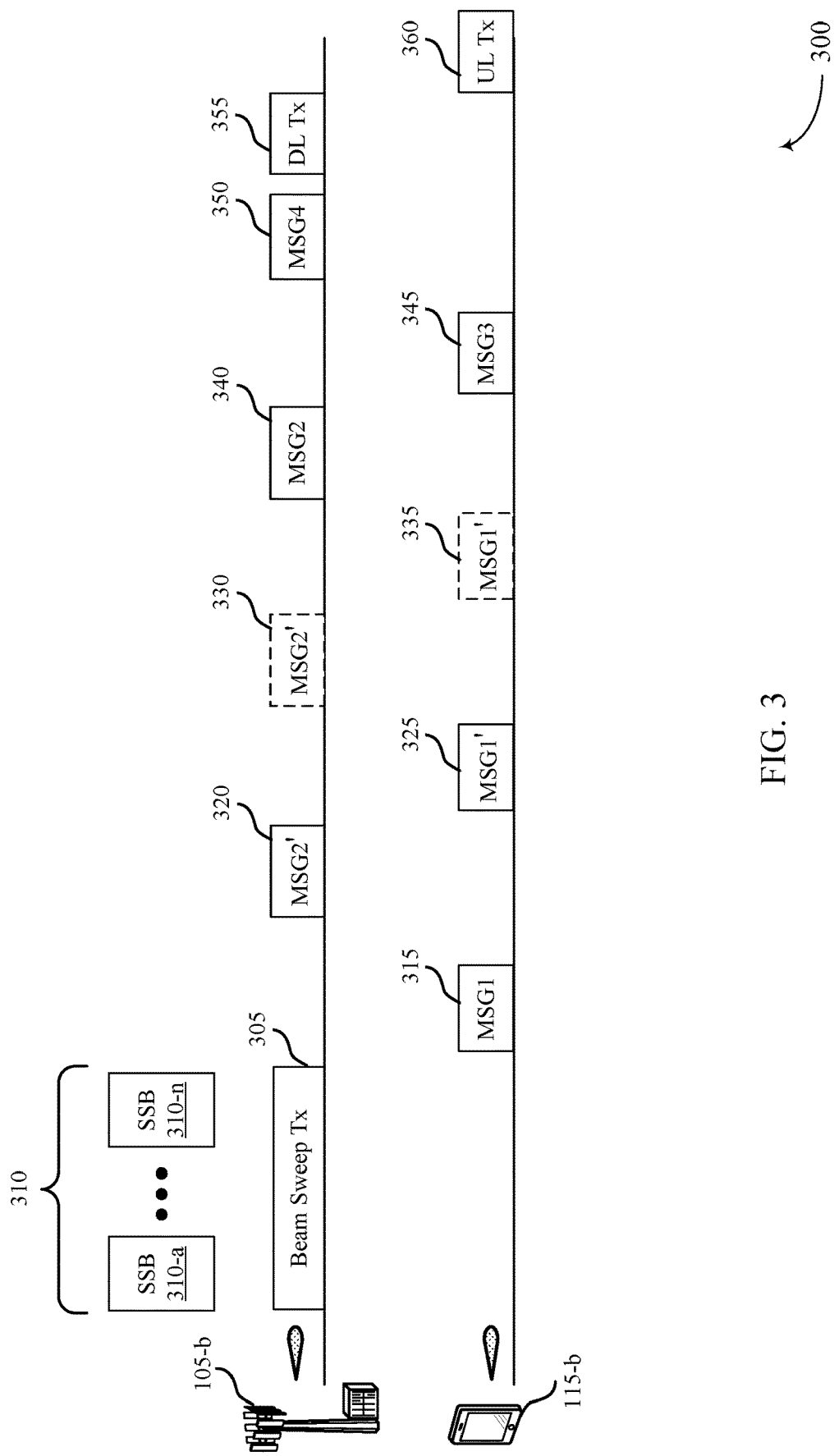
FIG. 3 illustrates an example of uplink and downlink transmissions that support random access with beam refinement in wireless communications in accordance with aspects of the present disclosure.
Figure 4:
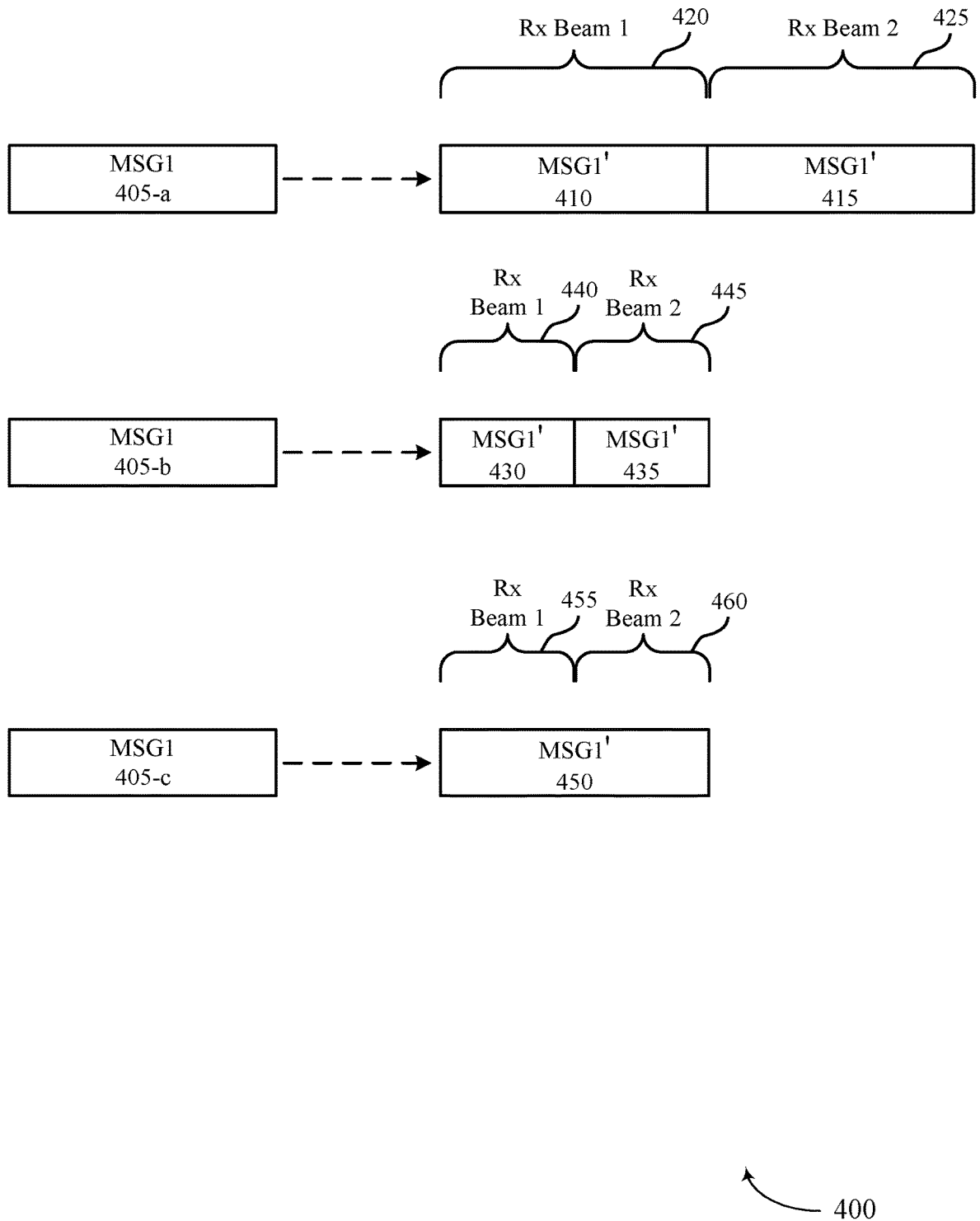
FIG. 4 illustrates an example of modified random access requests that support random access with beam refinement in wireless communications in accordance with aspects of the present disclosure.

FIG. 3 illustrates an example of a uplink and downlink transmissions 300 that support random access with beam refinement in wireless communications in accordance with aspects of the present disclosure. In some examples, uplink and downlink transmissions 300 may implement aspects of wireless communications system 100 or 200. In this example, a base station 105-*b*, which may be an example of a base station 105 of FIG. 1 or 2, may transmit multiple wide beam downlink transmissions in a beam sweep operation 405 that may be detected at UE 115-*b*. In some cases, each wide beam transmit an SSB 410. In the example of FIG. 4, a first SSB 310-*a* may be an SSB for a first beam, and so on until an n-th SSB 310-*n* for an n-th beam.

In some cases, the base station 105-*b*, within each SSB 310, may transmit synchronization information in the form of a primary synchronization signal (PSS), a secondary synchronization signal (SSS), and a physical broadcast channel (PBCH) transmission. In some cases, each SSB 310 may have an associated uplink transmission resource 315 (e.g., first RACH resources), and a random access request received in a particular RACH resource may indicate the associated SSB 310 that was selected by the UE 115-*b*. The UE 115-*b* in this example may monitor received signals during the beam sweep operation 305 and determine that the first SSB 310-*a* has a higher gain (e.g., a higher RSRP) than other of the SSBs 310, and may determine the associated first RACH resource for transmission of MSG1 315. In some examples, as discussed herein, the first SSB may have different subsets of RACH resources, where a first subset of the RACH resources may be used to indicate that the UE 115-*b* supports beam refinement in random access, and a second subset of the RACH resources may be used to indicate that the UE 115-*b* does not support beam refinement in random access or does not need such beam refinement (e.g., when a signal quality of signals from the first SSB 310-*a* are above a threshold value). In other cases, as discussed herein, different random access preambles for MSG1 315 may be selected to provide such an indication of beam refinement capability.

The base station 105-*b* may receive MSG1 315 and determine to transmit a PDCCH order in MSG2' 320 to trigger the UE 115-*b* to then transmit a modified random access request in MSG1' 325. The base station 105-*b* may monitor for the MSG1' 325 transmission using beamforming parameters associated with one or more refined beams in order to determine a refined beam to be used for subsequent random access communications. Optionally, the base station 105-*b* may transmit a second PDCCH order in MSG2' 330 to trigger a second MSG1' 335 that may be used for further beam refinement, and such a process may continue for one or more further PDCCH orders and responsive transmissions. The base station 105-*b* may perform beam refinement procedures when monitoring for the MSG1' transmission(s), such as by using multiple receive beam parameters to determine the refined beam, some examples of which will be discussed with reference to FIG. 4. The base station 105-*b* may use the refined beam to transmit MSG2 340. The UE 115-*b* may receive the MSG2 340 and transmit MSG3 345, which may be followed by a MSG4 350 from the base station 105-*b*, and downlink transmissions 355 and uplink transmissions 360.

FIG. 4 illustrates an example of modified random access requests 400 that support random access with beam refinement in wireless communications in accordance with aspects of the present disclosure. In some examples, modified random access requests 400 may implement aspects of wireless communications system 100 or 200. In this example, a UE (e.g., a UE 115 of FIG. 1, 2, or 3) may transmit a MSG1 405 and receive a MSG2' in response thereto, and indicates that the UE is to transmit a modified random access request that may be used as a beam refinement signal at the base station.

In some cases, the beam refinement signal waveform can be a same waveform as used for the random access request, and a format of the modified random access request can be the same as in MSG1 405 or different than the MSG1 405 format. In a first example, the UE may transmit MSG1 405-*a*, and in response to the PDCCH order, may transmit consecutive repetitions of the same waveform in MSG1' 410 and MSG1' 415. The base station, to perform beam refinement, may use a first receive beam 420 to measure MSG1' 410, and a second receive beam 425 to measure MSG1' 415. In other cases, the modified random access request may include more than two repetitions of the same waveform and the base station may measure using more than two receive beams.

In other examples, the UE may transmit MSG1 405-*b*, and in response to the PDCCH order, may transmit consecutive repetitions of a shorter modified random access request in MSG1' 430 and MSG1' 435. The base station, to perform beam refinement, may use first receive beam 440 to measure MSG1' 430, and a second receive beam 445 to measure MSG1' 435. In other cases, the modified random access request may include more than two repetitions of the waveform and the base station may measure using more than two receive beams. Thus, in such cases, the UE may use a shorter format in order to provide more repetitions during a same time period. Such techniques may allow adequate measurements at the base station to compare energy levels of different repetitions under different receive beams.

In still other examples, the UE may transmit MSG1 405-*c*, and in response to the PDCCH order, may retransmit the same signal in MSG1' 450. The base station, to perform beam refinement, may use first receive beam 455 to measure a first portion of MSG1' 450, and a second receive beam 460 to measure a second portion of MSG1' 450. In other cases, the base station may measure using more than two receive beams. Such techniques may be used in cases where the PRACH waveform is formed by multiple repetition of a same sequence, and thus the base station can switch receive beams in during the transmission to effectively treat one MSG1' 450 transmission as multiple reference signals. It is to be understood that the examples of FIG. 4 are provided for purposes of illustration and discussion, and that numerous other examples of modified random access requests and corresponding receive beams for measurement may be used in accordance with techniques as discussed herein.

Figure 5:
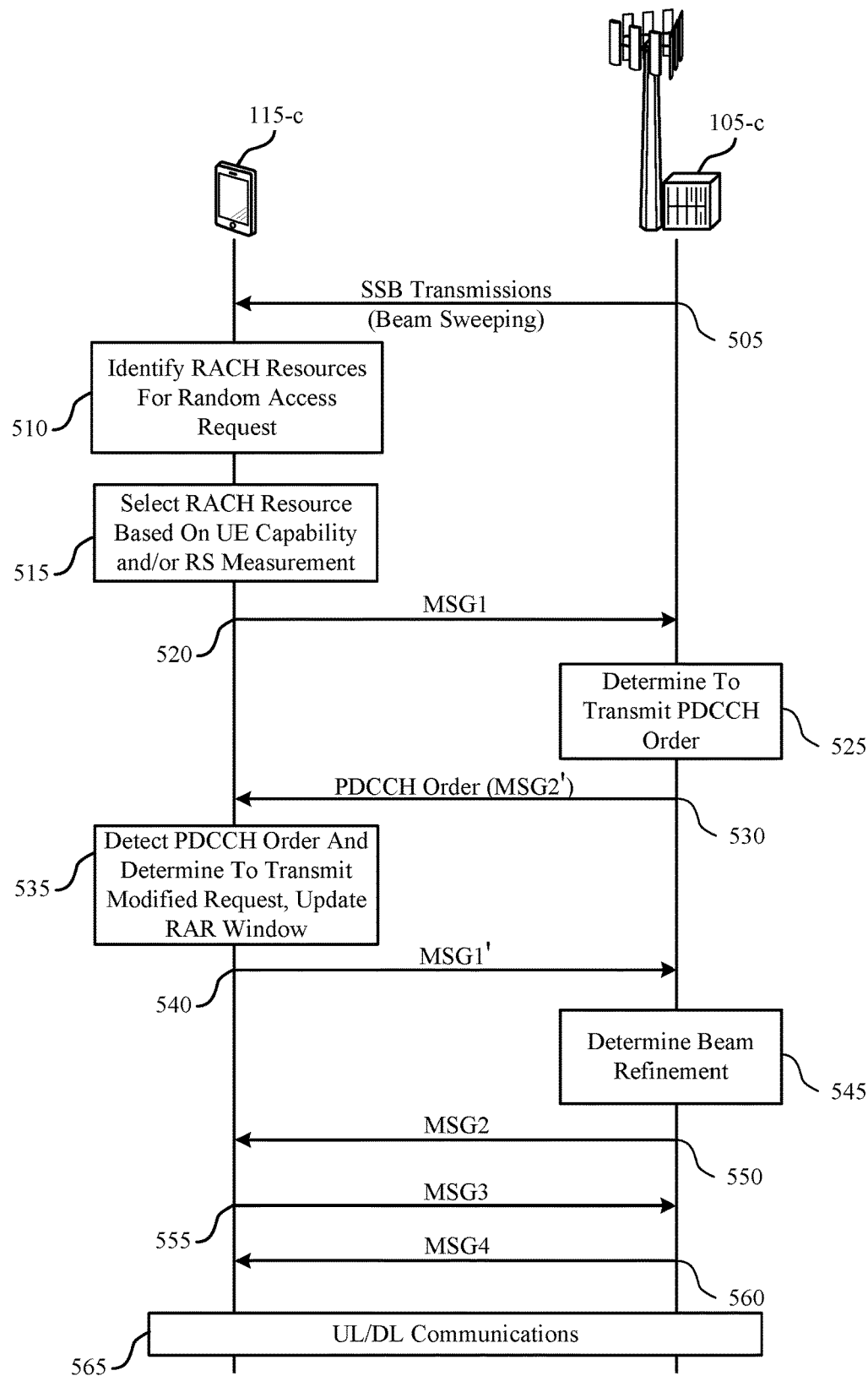
FIG. 5 illustrates an example of a process flow that supports random access with beam refinement in wireless communications in accordance with aspects of the present disclosure.

FIG. 5 illustrates an example of a process flow 500 that supports random access with beam refinement in wireless communications in accordance with aspects of the present disclosure. In some examples, process flow 500 may implement aspects of wireless communications system 100 or 200. Process flow 500 may be implemented by UE 115-*c* and base station 105-*c*, as described herein. Alternative examples of the following may be implemented, where some steps are performed in a different order than described or are not performed at all. In some cases, steps may include additional features not mentioned below, or further steps may be added.

At 505, the base station 105-*c* may transmit one or more SSB transmissions. In some cases, the SSB transmissions may be beam sweep transmissions of multiple SSBs that include synchronization signals (e.g., a PSS and a SSS) and PBCH transmissions, that are transmitted in a corresponding beam direction. In some cases, the SSBs may indicate an associated uplink transmission resource that UE 115-*c* may use for a random access transmission.

At 510, the UE 115-*b* may identify RACH resources for a random access request. As discussed herein, in some cases the RACH resources may be associated with a particular SSB that is selected at the UE 115-*b* based on a received signal strength.

At 515, the UE 115-*b* may select a particular RACH resource based on UE capability, one or more reference signal measurements, or any combinations thereof. In some cases, within the RACH resources associated with a SSB, a subset of resources may be available for UEs that are capable of random access beam refinement techniques as discussed herein, and a different subset of resources may be available for UEs that are not capable of or do not need random access beam refinement. At 520, based on the selected RACH resources, the UE 115-*c* may transmit MSG1. In some cases, the preamble used in the MSG1 transmission may be used to indicate whether the UE 115-*c* is requesting beam refinement in the random access technique or not, as discussed in accordance with various examples herein.

At 525, the base station 105-*c* may determine to transmit a PDCCH order to the UE 115-*c*. In some cases, the base station 105-*c* may make such a determination based on the RACH resource used to transmit MSG1, or based on a preamble used for MSG1. In some cases, even though the MSG1 resources or preamble may indicate that beam refinement in random access is supported, the base station 105-*c* may elect to simply move forward with a standard MSG2 rather than the PDCCH order (e.g., based on available random access resources, a signal strength of the MSG1 transmission, and the like). In this example, the base station 105-*c* determines to transmit PDCCH order, and at 530 transmits the PDCCH order to the UE 115-*c*.

At 535, the UE 115-c may detect the PDCCH order and determine to transmit a modified random access request to the base station 105-c, which may be used for beam refinement. The UE 115-c may, based on the PDCCH order, also update a random access response window to provide time during which one or more further PDCCH orders may be communicated, a regular MSG2 is communicated, or combinations thereof. At 540, the UE 115-c may transmit MSG1' to the base station 105-c.

At 545, the base station 105-c may monitor for the MSG1' transmission using two or more receive beams to determine beam refinement for use in subsequent communications with the UE 115-c. In some cases, the base station 105-c may determine beam refinement based on which of two or more receive beams provide a better signal strength for reception of the MSG1' transmission.

At 550, the base station 105-c may transmit a regular MSG2 to the UE 115-c. The MSG2 transmission may use a refined transmit beam that is determined based on the beam refinement performed at the base station 105-c. At 555, the UE 115-c may transmit MSG3 in accordance with established RACH techniques, followed at 560 by a MSG4 transmission from the base station 105-c and at 565 by uplink/downlink communications between the UE 115-c and the base station 105-c.

Figure 6:
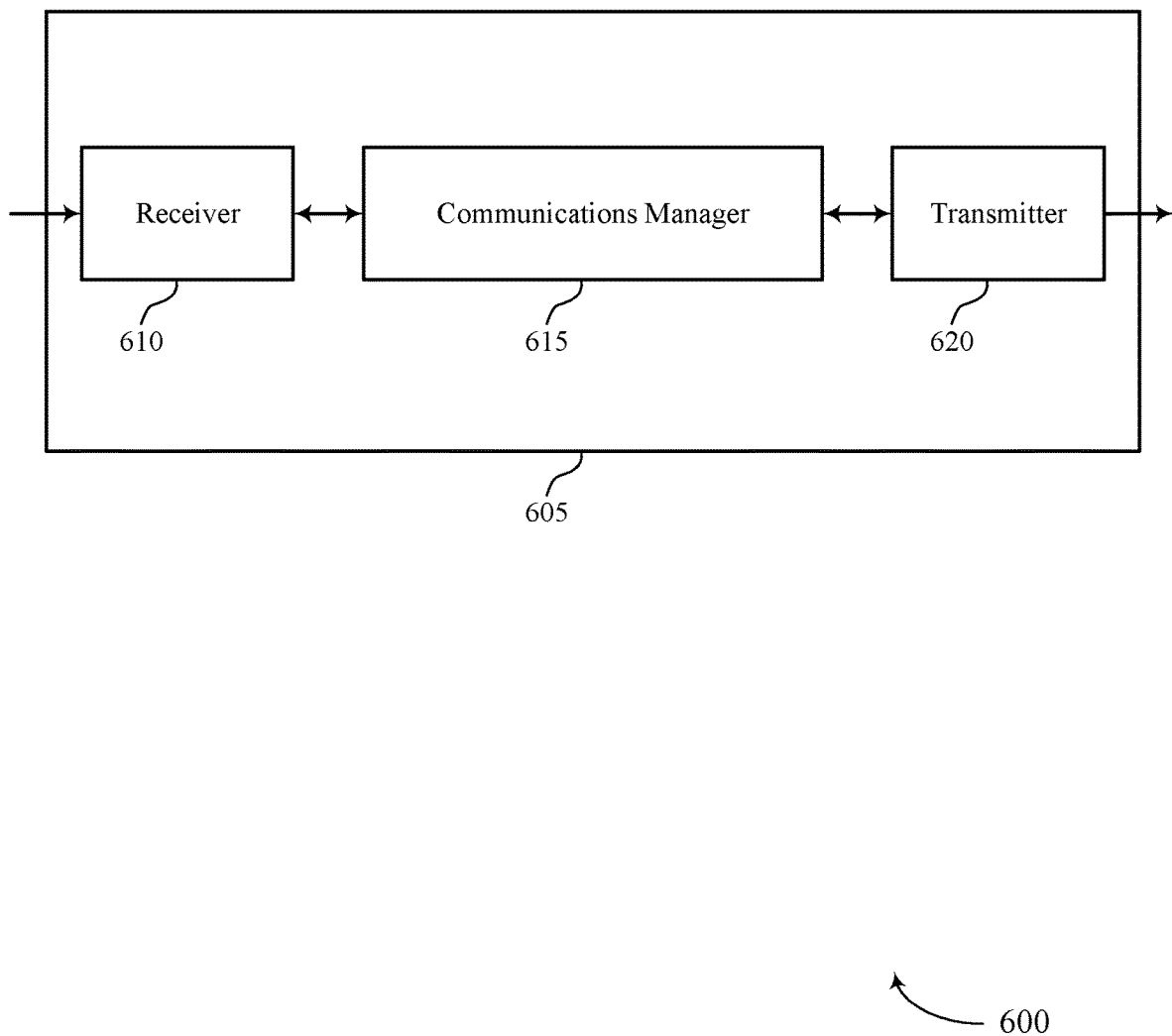
FIGS. 6 and 7 show block diagrams of devices that support random access with beam refinement in wireless communications in accordance with aspects of the present disclosure.

FIG. 6 shows a block diagram 600 of a device 605 that supports random access with beam refinement in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to random access with beam refinement in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit an initial random access request to a base station to establish a wireless connection with the base station, receive a random access response from the base station indicating an uplink resource for transmission of a UE identification message, transmit the UE identification message to the base station via the indicated uplink resource, receive a control channel order in the form of a control channel transmission from the base station, and transmit one or more modified random access requests to the base station responsive to the control channel order. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615 may as described herein be implemented to realize one or more potential advantages. One implementation may allow the device 605 to perform random access processes with higher likelihood of success, which may provide enhanced efficiency and reduced access time associated with random access procedures. Further, implementations may allow the device 605 to enhance reliability of communications, increase throughput, and enhance user experience, while reducing power consumption associated with retransmissions or additional random access attempts, among other advantages.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
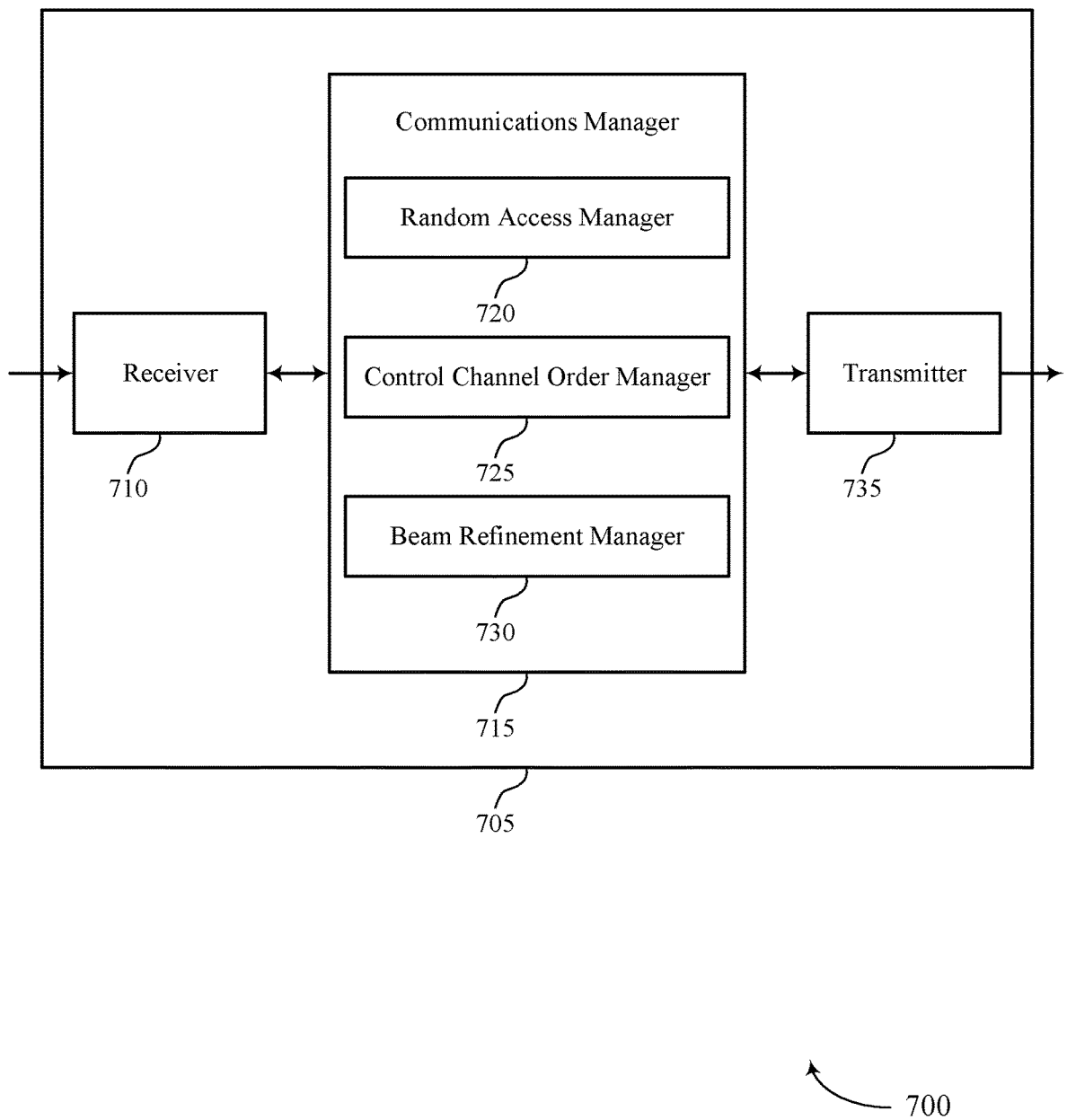

FIG. 7 shows a block diagram 700 of a device 705 that supports random access with beam refinement in wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to random access with beam refinement in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a random access manager 720, a control channel order manager 725, and a beam refinement manager 730. The communications manager 715 may be an example of aspects of the communications manager 910 described herein.

The random access manager 720 may transmit an initial random access request to a base station to establish a wireless connection with the base station, receive a random access response from the base station indicating an uplink resource for transmission of a UE identification message, and transmit the UE identification message to the base station via the indicated uplink resource.

The control channel order manager 725 may receive a control channel order in the form of a control channel transmission from the base station.

The beam refinement manager 730 may transmit one or more modified random access requests to the base station responsive to the control channel order.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
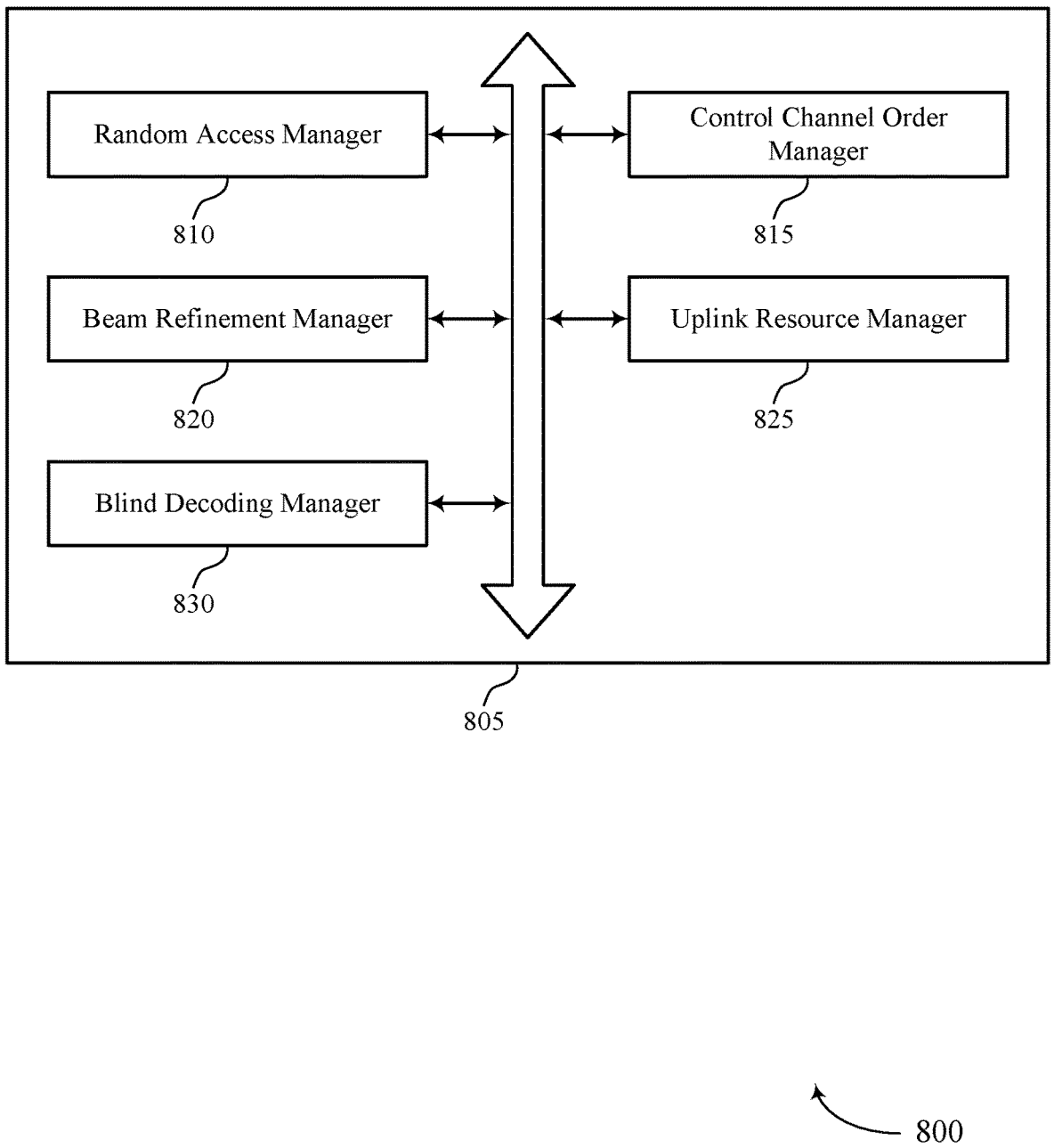
FIG. 8 shows a block diagram of a communications manager that supports random access with beam refinement in wireless communications in accordance with aspects of the present disclosure.

FIG. 8 shows a block diagram 800 of a communications manager 805 that supports random access with beam refinement in wireless communications in accordance with aspects of the present disclosure. The communications manager 805 may be an example of aspects of a communications manager 615, a communications manager 715, or a communications manager 910 described herein. The communications manager 805 may include a random access manager 810, a control channel order manager 815, a beam refinement manager 820, an uplink resource manager 825, and a blind decoding manager 830. Each of these modules may communicate, directly or indirectly, with one another (e.g., via one or more buses).

The random access manager 810 may transmit an initial random access request to a base station to establish a wireless connection with the base station. In some examples, the random access manager 810 may identify a first random access occasion for transmitting the initial random access request from a set of random access occasions, where using the first random access occasion indicates that the UE is to monitor for the control channel order for beam refinement during random access (along with monitoring for a random access response), and where a random access request transmitted using a second random access occasion of the set of random access occasions indicates that the UE is to monitor for the random access response without monitoring for the control channel order. In some examples, the random access manager 810 may select the first random access occasion based on a measurement of one or more channel characteristics of a transmission from the base station. In some cases, the first random access occasion is selected based on a measured reference signal strength from the base station being below a signal strength threshold value. In some cases, the first random access occasion is selected based on one or more other random access request transmissions using the second random access occasion having a transmission power that exceeds a power threshold value.

In some examples, the random access manager 810 may receive a random access response from the base station indicating an uplink resource for transmission of a UE identification message. In some examples, the random access manager 810 may transmit the UE identification message to the base station via the indicated uplink resource.

The control channel order manager 815 may receive a control channel order in the form of a control channel transmission from the base station. In some examples, the control channel order manager 815 may monitor for a control channel message that is scrambled with a random access temporary identifier that corresponds to the initial random access request. In some examples, the control channel order manager 815 may receive, prior to receiving the random access response, a second control channel order from the base station.

In some examples, the control channel order manager 815 may monitor for the control channel order using a receive beam that is associated with a synchronization signal block received from the base station, and where the control channel order has a higher coding gain than a control channel transmission granting the random access response due to smaller payload size. In some examples, the control channel order manager 815 may monitor for the control channel order during a random access response window that is associated with the initial random access request, and where the random access response window is reset responsive to transmitting the modified random access request. In some examples, the control channel order manager 815 may monitor for the control channel order during a random access response window that is configured by the base station. In some examples, the control channel order manager 815 may monitor for the control channel order during a random access response window, where a duration of the random access response window is determined based on a random access occasion used to transmit the initial random access request, a random access preamble of the initial random access request, or any combinations thereof.

In some cases, the control channel order indicates a preamble index associated with a random access preamble, and where the UE disregards the control channel order when the preamble index does not correspond to a preamble of the initial random access request.

The beam refinement manager 820 may transmit one or more modified random access requests to the base station responsive to the control channel order. In some examples, the beam refinement manager 820 may transmit, responsive to the second control channel order, a second instance of one or more modified random access requests to the base station.

In some cases, the modified random access request includes one or more repetitions of a preamble sequence of the initial random access request and uses an uplink resource that is indicated by the control channel order. In some cases, each of the one or more repetitions is an abbreviated version of the initial random access request.

The uplink resource manager 825 may determine, based on the control channel order, uplink resources for the one or more modified random access requests. The blind decoding manager 830 may perform a blind decoding procedure in a common search space based on the initial random access request.

Figure 9:
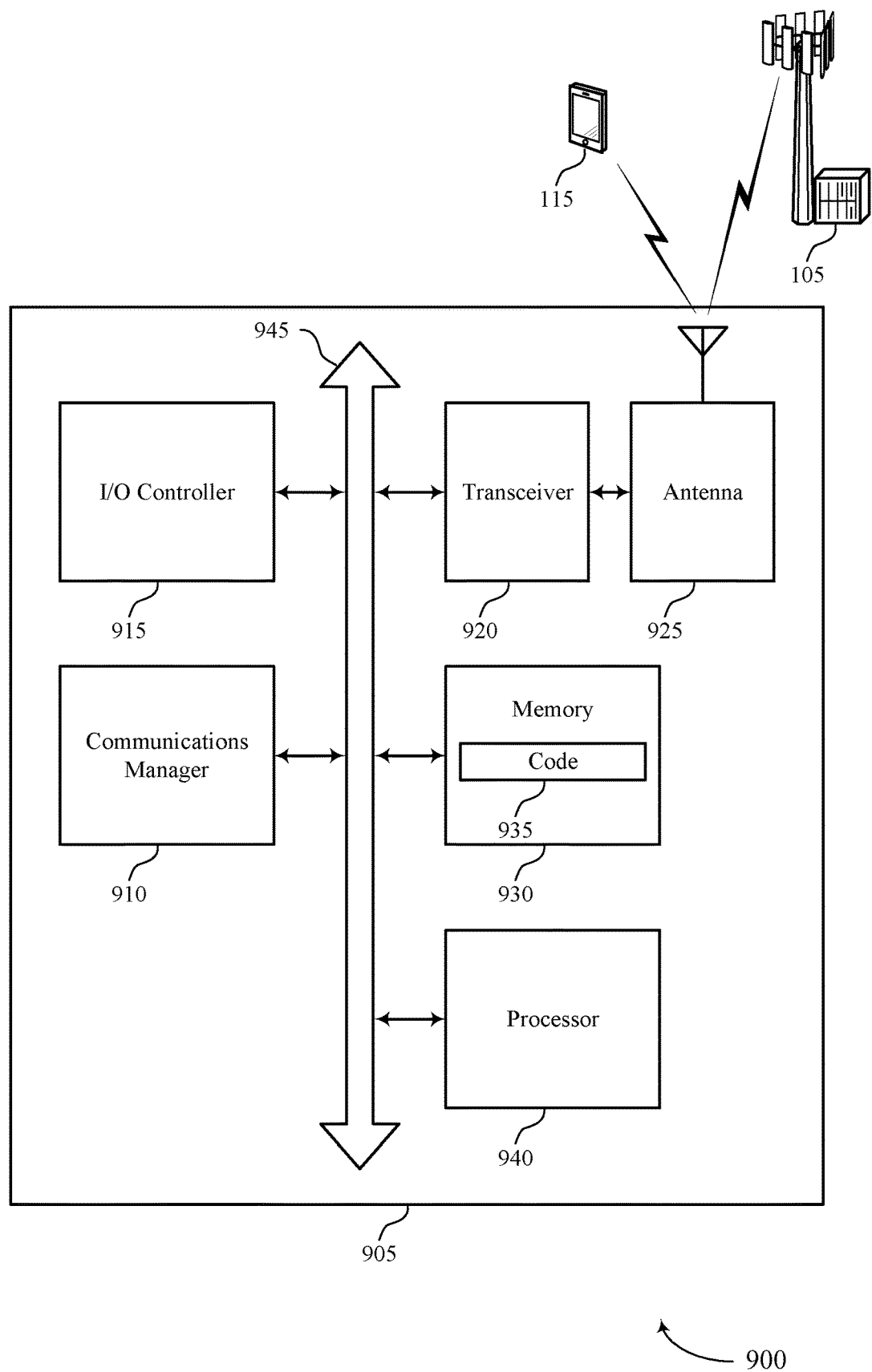
FIG. 9 shows a diagram of a system including a device that supports random access with beam refinement in wireless communications in accordance with aspects of the present disclosure.

FIG. 9 shows a diagram of a system 900 including a device 905 that supports random access with beam refinement in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit an initial random access request to a base station to establish a wireless connection with the base station, receive a random access response from the base station indicating an uplink resource for transmission of a UE identification message, transmit the UE identification message to the base station via the indicated uplink resource, receive a control channel order in the form of a control channel transmission from the base station, and transmit one or more modified random access requests to the base station responsive to the control channel order.

The communications manager 910 may as described herein be implemented to realize one or more potential advantages. One implementation may allow the device 905 to perform random access processes with higher likelihood of success, which may provide enhanced efficiency and reduced access time associated with random access procedures. Further, implementations may allow the device 905 to enhance reliability of communications, increase throughput, and enhance user experience, while reducing power consumption associated with retransmissions or additional random access attempts, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting random access with beam refinement in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
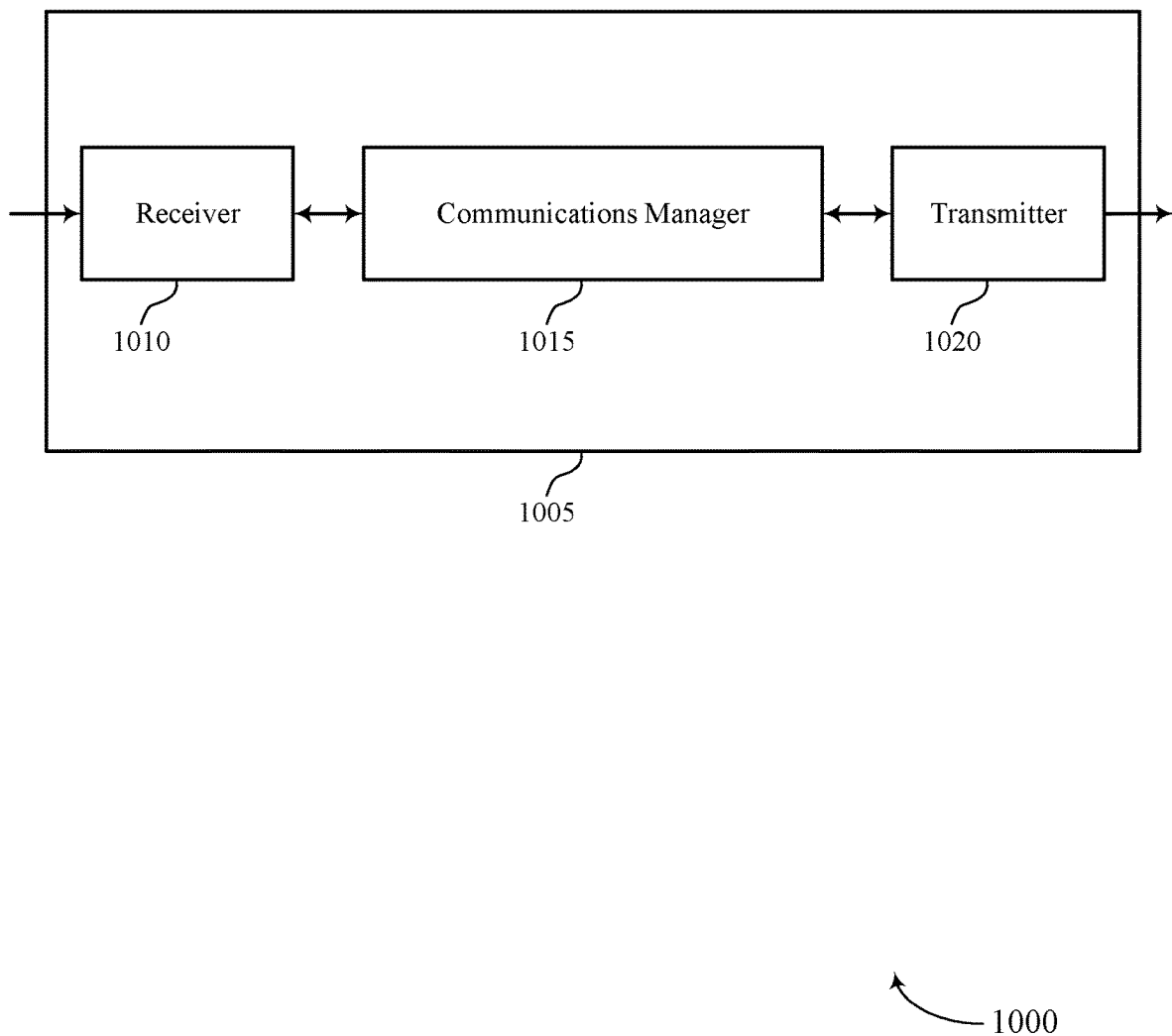
FIGS. 10 and 11 show block diagrams of devices that support random access with beam refinement in wireless communications in accordance with aspects of the present disclosure.

FIG. 10 shows a block diagram 1000 of a device 1005 that supports random access with beam refinement in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to random access with beam refinement in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, an initial random access request to establish a wireless connection with the base station, transmit a random access response to the UE using a refined transmit beam that is determined based on the beam refinement procedure, the random access response indicating an uplink resource for transmission of a UE identification message, receive the UE identification message from the UE via the indicated uplink resource, transmit, to the UE, a control channel order in the form of a control channel transmission, and perform a beam refinement procedure based on measurements of one or more modified random access requests received from the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
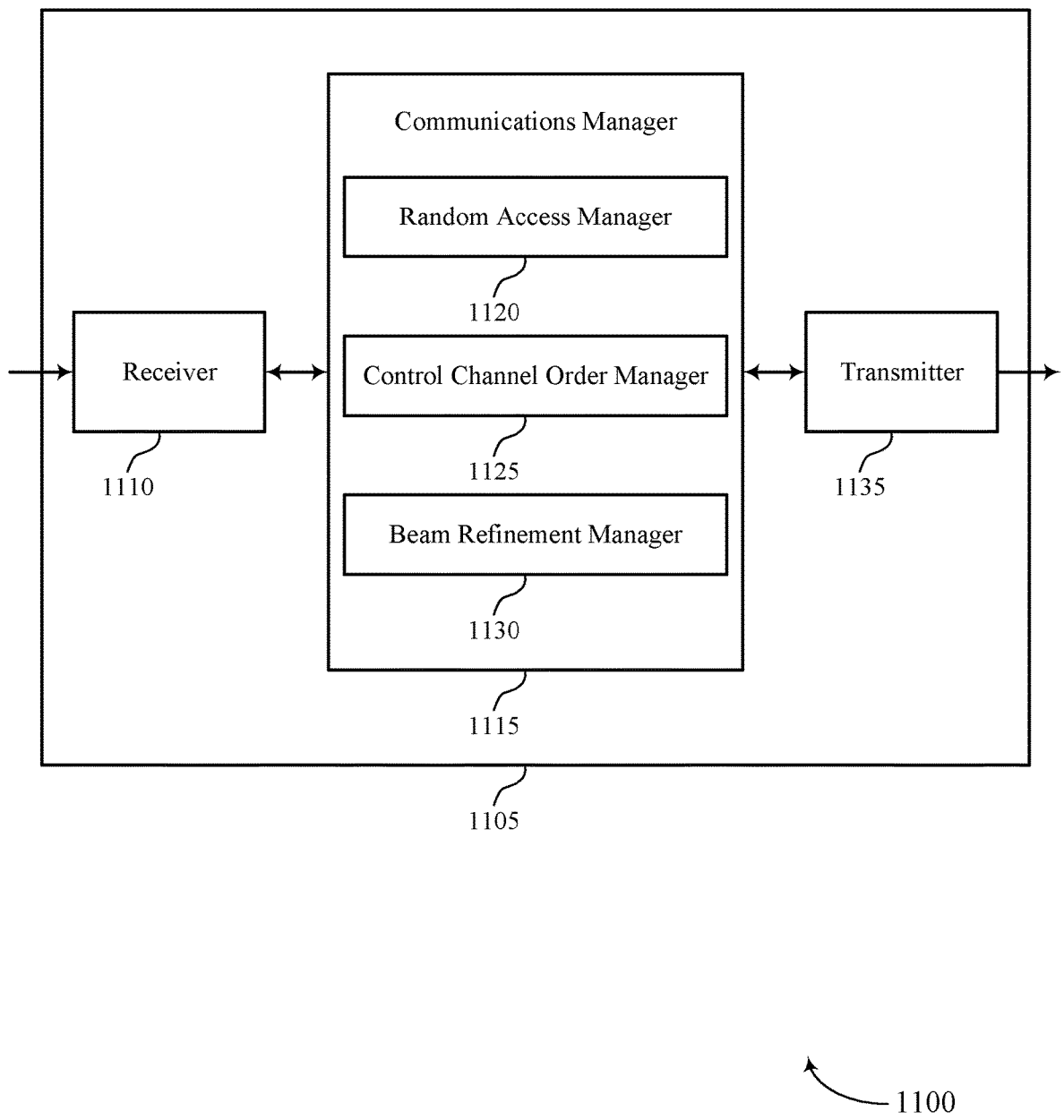

FIG. 11 shows a block diagram 1100 of a device 1105 that supports random access with beam refinement in wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to random access with beam refinement in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a random access manager 1120, a control channel order manager 1125, and a beam refinement manager 1130. The communications manager 1115 may be an example of aspects of the communications manager 1310 described herein.

The random access manager 1120 may receive, from a UE, an initial random access request to establish a wireless connection with the base station, transmit a random access response to the UE using a refined transmit beam that is determined based on the beam refinement procedure, the random access response indicating an uplink resource for transmission of a UE identification message, and receive the UE identification message from the UE via the indicated uplink resource.

The control channel order manager 1125 may transmit, to the UE, a control channel order in the form of a control channel transmission responsive to the initial random access request.

The beam refinement manager 1130 may perform a beam refinement procedure based on measurements of one or more modified random access requests received from the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
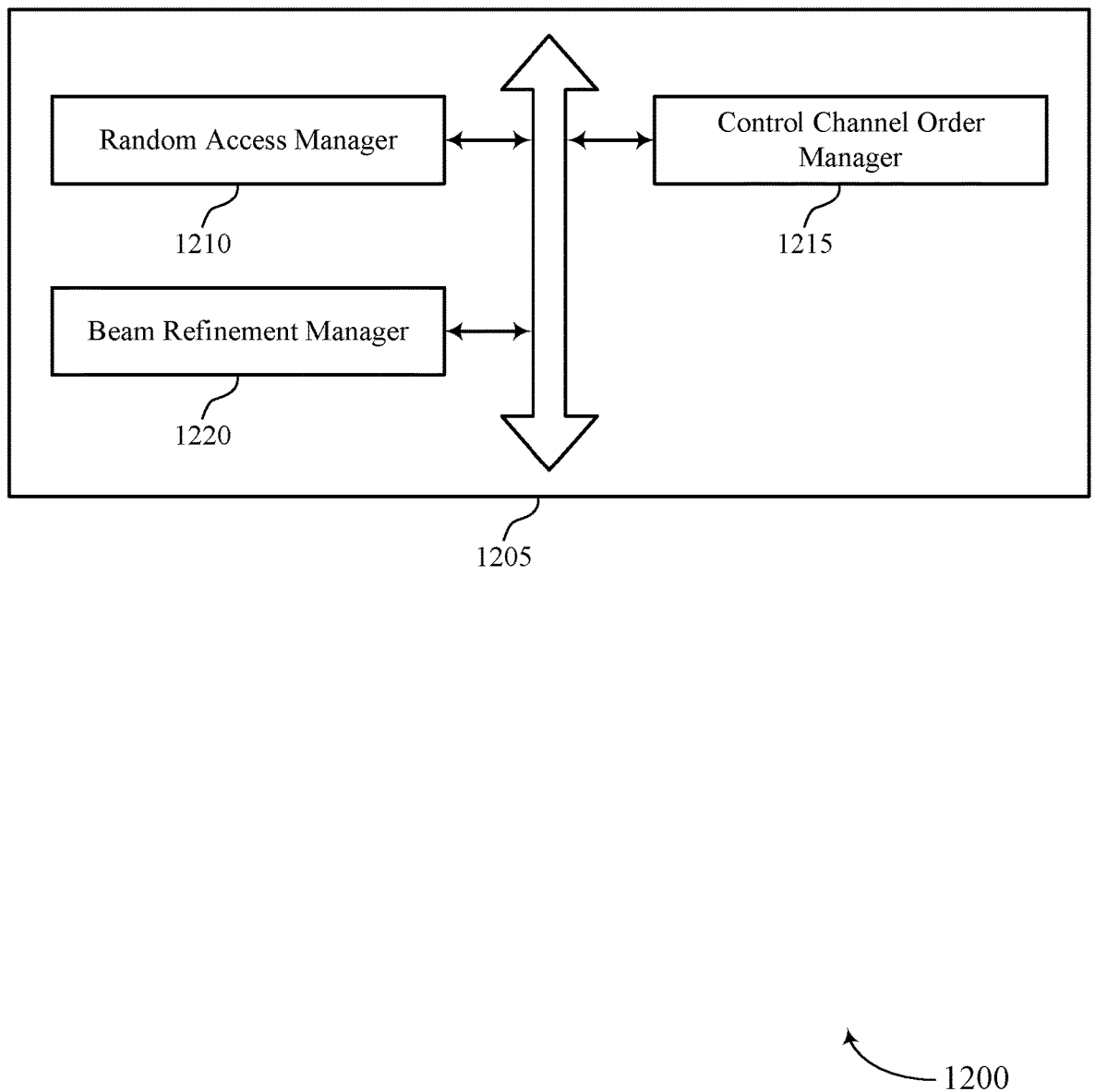
FIG. 12 shows a block diagram of a communications manager that supports random access with beam refinement in wireless communications in accordance with aspects of the present disclosure.

FIG. 12 shows a block diagram 1200 of a communications manager 1205 that supports random access with beam refinement in wireless communications in accordance with aspects of the present disclosure. The communications manager 1205 may be an example of aspects of a communications manager 1015, a communications manager 1115, or a communications manager 1310 described herein. The communications manager 1205 may include a random access manager 1210, a control channel order manager 1215, and a beam refinement manager 1220. Each of these modules may communicate, directly or indirectly, with one another (e.g., via one or more buses).

The random access manager 1210 may receive, from a UE, an initial random access request to establish a wireless connection with the base station. In some examples, the random access manager 1210 may transmit a random access response to the UE using a refined transmit beam that is determined based on the beam refinement procedure, the random access response indicating an uplink resource for transmission of a UE identification message. In some examples, the random access manager 1210 may receive the UE identification message from the UE via the indicated uplink resource.

In some examples, the random access manager 1210 may configure a set of random access occasions for two or more different types of random access, the set of random access occasions including a first random access occasion that is configured to provide for beam refinement during random access through the control channel order and the modified random access request, and a second random access occasion that is configured for random access without beam refinement through transmission of the random access response without transmitting the control channel order or measurements of one or more modified random access requests.

In some examples, the random access manager 1210 may configure a random access response window duration that is to be used at the UE for monitoring for the control channel order and the random access response. In some cases, a random access response window that is associated with the initial random access request is reset responsive to receiving the modified random access request. In some cases, a random access response window that is associated with the initial random access request is determined based on a random access occasion used to transmit the initial random access request, a random access preamble of the initial random access request, or any combinations thereof.

The control channel order manager 1215 may transmit, to the UE, a control channel order in the form of a control channel transmission. In some examples, the control channel order manager 1215 may scramble a control channel message with a random access temporary identifier that corresponds to the initial random access request. In some examples, the control channel order manager 1215 may transmit, responsive to the modified random access request, a second control channel order to the UE, and where the beam refinement procedure is further based on measurements of a second modified random access request received from the UE responsive to the second control channel order.

In some examples, the control channel order manager 1215 may transmit a first control channel order using a first beam. In some cases, the control channel order indicates uplink resources for the one or more modified random access requests. In some cases, the control channel order has a higher coding gain than the control channel transmission granting the random access response due to a smaller payload size. In some cases, the control channel order is transmitted using a beam that corresponds to a synchronization signal block that is transmitted by the base station.

The beam refinement manager 1220 may perform a beam refinement procedure based on measurements of one or more modified random access requests received from the UE responsive to the control channel order. In some examples, the beam refinement manager 1220 may transmit, responsive to not detecting the modified random access request subsequent to the first control channel order, a second control channel order using a second beam, where the modified random access request is received from the UE responsive to the second control channel order.

In some examples, the beam refinement manager 1220 may select the second beam as the refined transmit beam. In some examples, the beam refinement manager 1220 may measure a first signal strength of the modified random access response using a first receive beam and a second signal strength of the modified random access response using a second receive beam. In some examples, the beam refinement manager 1220 may select the refined transmit beam based on the first signal strength and the second signal strength. In some cases, the modified random access request includes one or more repetitions of a preamble sequence of the initial random access request and uses an uplink resource that is indicated by the control channel order. In some cases, each of the one or more repetitions is an abbreviated version of the initial random access request.

Figure 13:
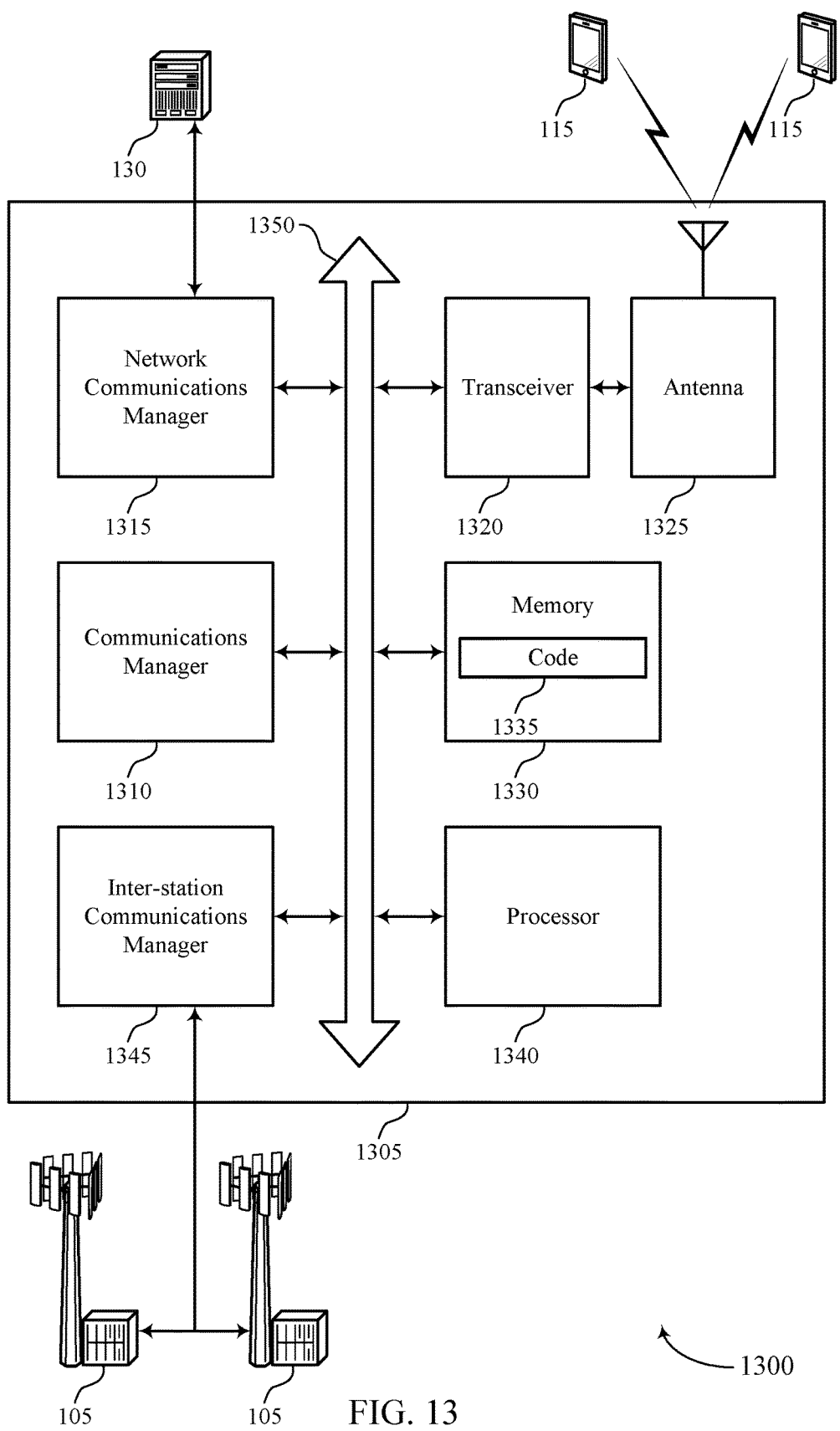
FIG. 13 shows a diagram of a system including a device that supports random access with beam refinement in wireless communications in accordance with aspects of the present disclosure.

FIG. 13 shows a diagram of a system 1300 including a device 1305 that supports random access with beam refinement in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, an initial random access request to establish a wireless connection with the base station, transmit a random access response to the UE using a refined transmit beam that is determined based on the beam refinement procedure, the random access response indicating an uplink resource for transmission of a UE identification message, receive the UE identification message from the UE via the indicated uplink resource, transmit, to the UE, a control channel order in the form of a control channel transmission, and perform a beam refinement procedure based on measurements of one or more modified random access requests received from the UE responsive to the control channel order.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting random access with beam refinement in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
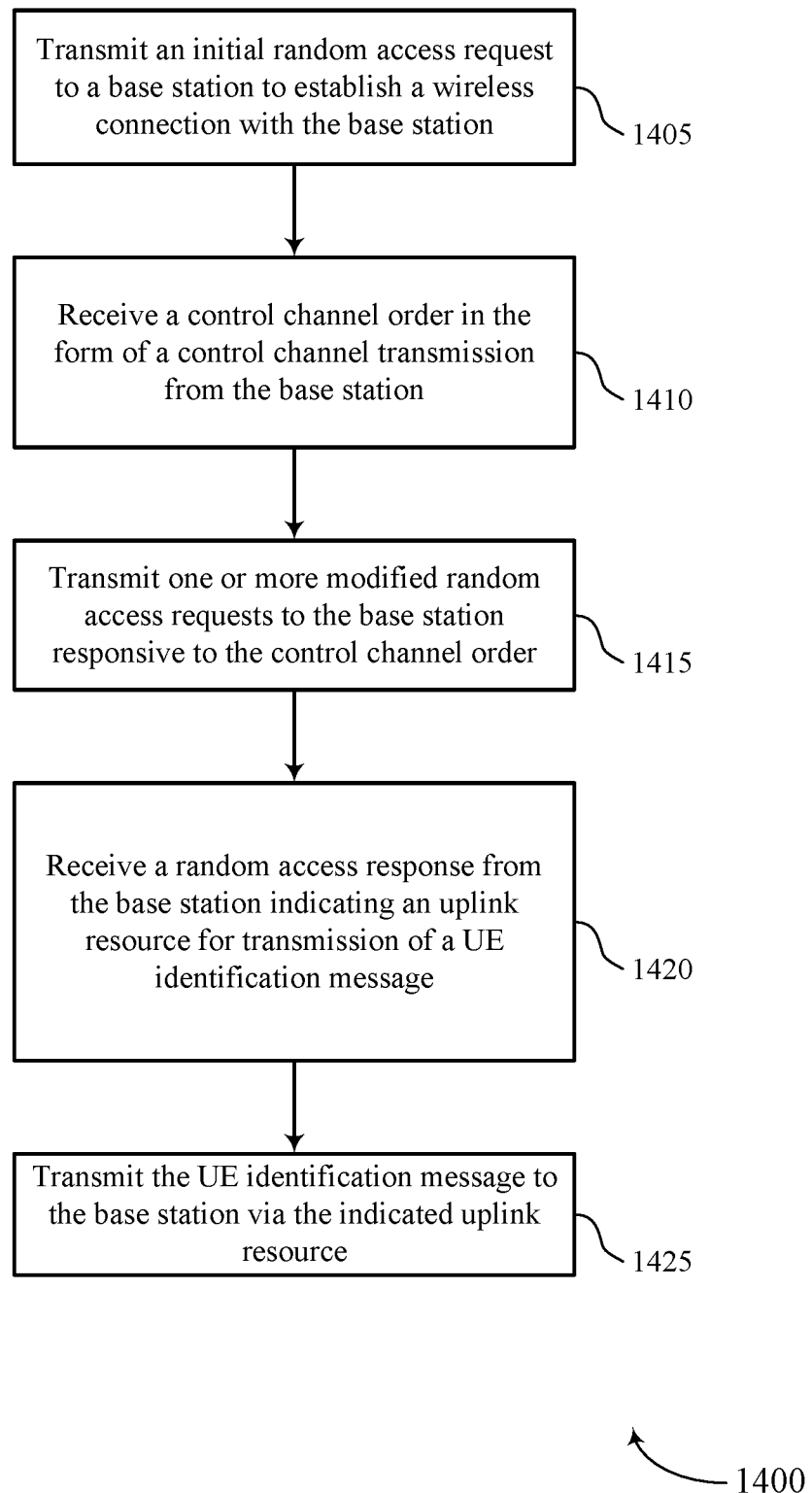
FIGS. 14 through 17 show flowcharts illustrating methods that support random access with beam refinement in wireless communications in accordance with aspects of the present disclosure.

FIG. 14 shows a flowchart illustrating a method 1400 that supports random access with beam refinement in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit an initial random access request to a base station to establish a wireless connection with the base station. The operations of 1405 may be performed according to the methods described herein. In some examples, aspects of the operations of 1405 may be performed by a random access manager as described with reference to FIGS. 6 through 9.

At 1410, the UE may receive a control channel order in the form of a control channel transmission from the base station. The operations of 1410 may be performed according to the methods described herein. In some examples, aspects of the operations of 1410 may be performed by a control channel order manager as described with reference to FIGS. 6 through 9.

At 1415, the UE may transmit one or more modified random access requests to the base station responsive to the control channel order. The operations of 1415 may be performed according to the methods described herein. In some examples, aspects of the operations of 1415 may be performed by a beam refinement manager as described with reference to FIGS. 6 through 9.

At 1420, the UE may receive a random access response from the base station indicating an uplink resource for transmission of a UE identification message. The operations of 1420 may be performed according to the methods described herein. In some examples, aspects of the operations of 1420 may be performed by a random access manager as described with reference to FIGS. 6 through 9.

At 1425, the UE may transmit the UE identification message to the base station via the indicated uplink resource. The operations of 1425 may be performed according to the methods described herein. In some examples, aspects of the operations of 1425 may be performed by a random access manager as described with reference to FIGS. 6 through 9.

Figure 15:
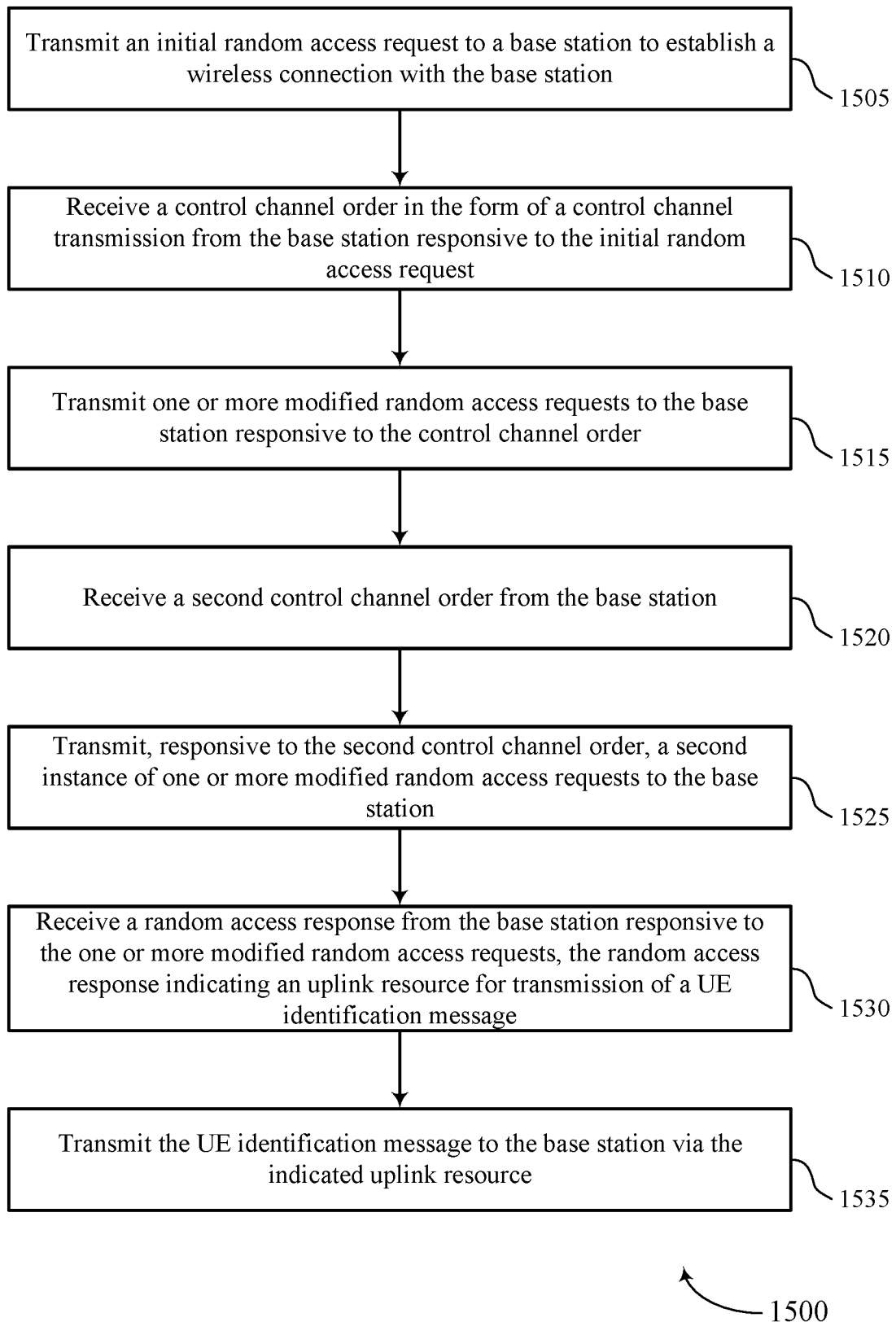

FIG. 15 shows a flowchart illustrating a method 1500 that supports random access with beam refinement in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit an initial random access request to a base station to establish a wireless connection with the base station. The operations of 1505 may be performed according to the methods described herein. In some examples, aspects of the operations of 1505 may be performed by a random access manager as described with reference to FIGS. 6 through 9.

At 1510, the UE may receive a control channel order in the form of a control channel transmission from the base station responsive to the initial random access request. The operations of 1510 may be performed according to the methods described herein. In some examples, aspects of the operations of 1510 may be performed by a control channel order manager as described with reference to FIGS. 6 through 9.

At 1515, the UE may transmit one or more modified random access requests to the base station responsive to the control channel order. The operations of 1515 may be performed according to the methods described herein. In some examples, aspects of the operations of 1515 may be performed by a beam refinement manager as described with reference to FIGS. 6 through 9.

At 1520, the UE may receive a second control channel order from the base station. The operations of 1520 may be performed according to the methods described herein. In some examples, aspects of the operations of 1520 may be performed by a control channel order manager as described with reference to FIGS. 6 through 9.

At 1525, the UE may transmit, responsive to the second control channel order, a second instance of one or more modified random access requests to the base station. The operations of 1525 may be performed according to the methods described herein. In some examples, aspects of the operations of 1525 may be performed by a beam refinement manager as described with reference to FIGS. 6 through 9.

At 1530, the UE may receive a random access response from the base station responsive to the one or more modified random access requests, the random access response indicating an uplink resource for transmission of a UE identification message. The operations of 1530 may be performed according to the methods described herein. In some examples, aspects of the operations of 1530 may be performed by a random access manager as described with reference to FIGS. 6 through 9.

At 1535, the UE may transmit the UE identification message to the base station via the indicated uplink resource. The operations of 1535 may be performed according to the methods described herein. In some examples, aspects of the operations of 1535 may be performed by a random access manager as described with reference to FIGS. 6 through 9.

Figure 16:
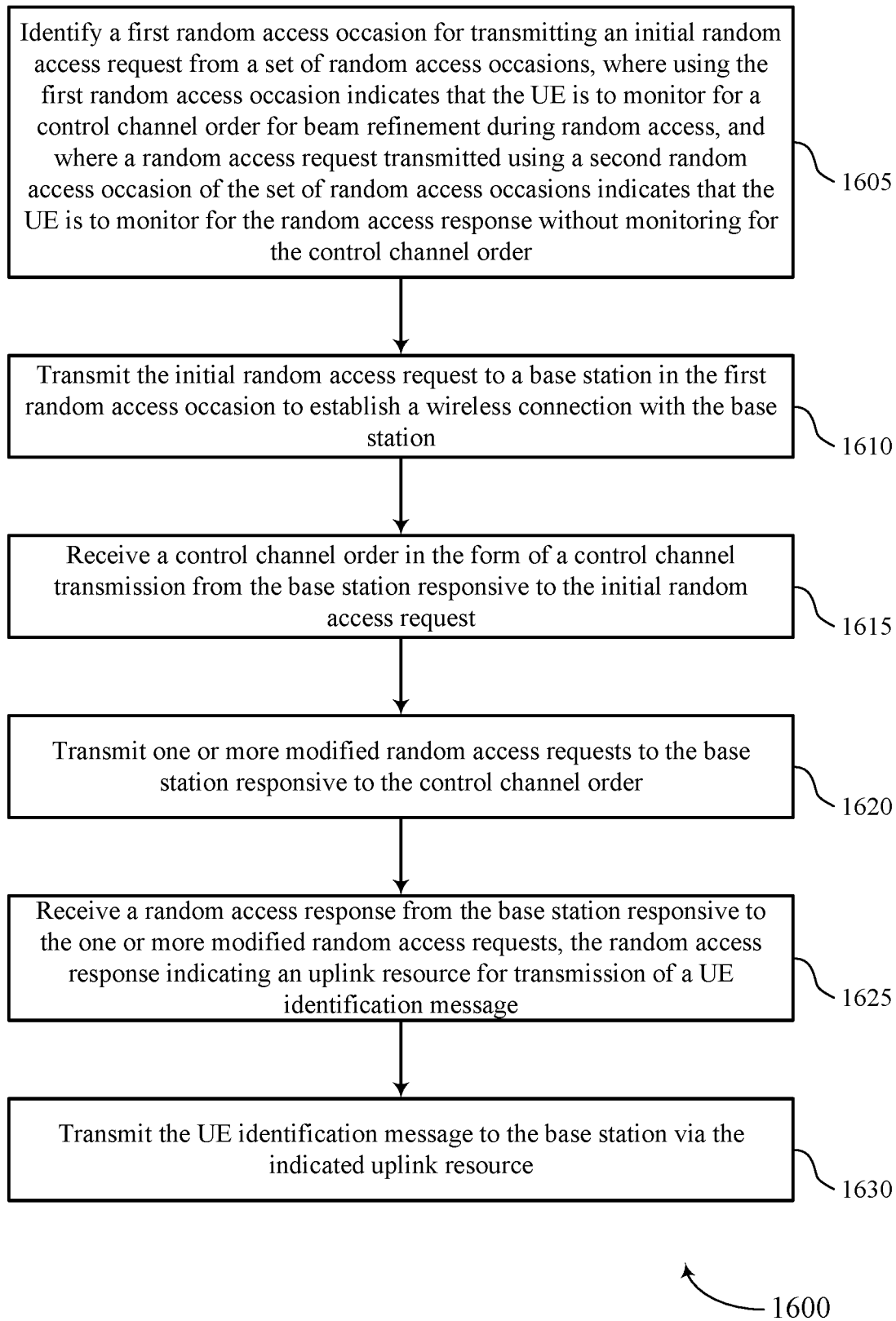

FIG. 16 shows a flowchart illustrating a method 1600 that supports random access with beam refinement in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a first random access occasion for transmitting an initial random access request from a set of random access occasions, where using the first random access occasion indicates that the UE is to monitor for a control channel order for beam refinement during random access, and where a random access request transmitted using a second random access occasion of the set of random access occasions indicates that the UE is to monitor for the random access response without monitoring for the control channel order. The operations of 1605 may be performed according to the methods described herein. In some examples, aspects of the operations of 1605 may be performed by a random access manager as described with reference to FIGS. 6 through 9.

At 1610, the UE may transmit the initial random access request to a base station in the first random access occasion to establish a wireless connection with the base station. The operations of 1610 may be performed according to the methods described herein. In some examples, aspects of the operations of 1610 may be performed by a random access manager as described with reference to FIGS. 6 through 9.

At 1615, the UE may receive a control channel order in the form of a control channel transmission from the base station responsive to the initial random access request. The operations of 1615 may be performed according to the methods described herein. In some examples, aspects of the operations of 1615 may be performed by a control channel order manager as described with reference to FIGS. 6 through 9.

At 1620, the UE may transmit one or more modified random access requests to the base station responsive to the control channel order. The operations of 1620 may be performed according to the methods described herein. In some examples, aspects of the operations of 1620 may be performed by a beam refinement manager as described with reference to FIGS. 6 through 9.

At 1625, the UE may receive a random access response from the base station responsive to the one or more modified random access requests, the random access response indicating an uplink resource for transmission of a UE identification message. The operations of 1625 may be performed according to the methods described herein. In some examples, aspects of the operations of 1625 may be performed by a random access manager as described with reference to FIGS. 6 through 9.

At 1630, the UE may transmit the UE identification message to the base station via the indicated uplink resource. The operations of 1630 may be performed according to the methods described herein. In some examples, aspects of the operations of 1630 may be performed by a random access manager as described with reference to FIGS. 6 through 9.

Figure 17:
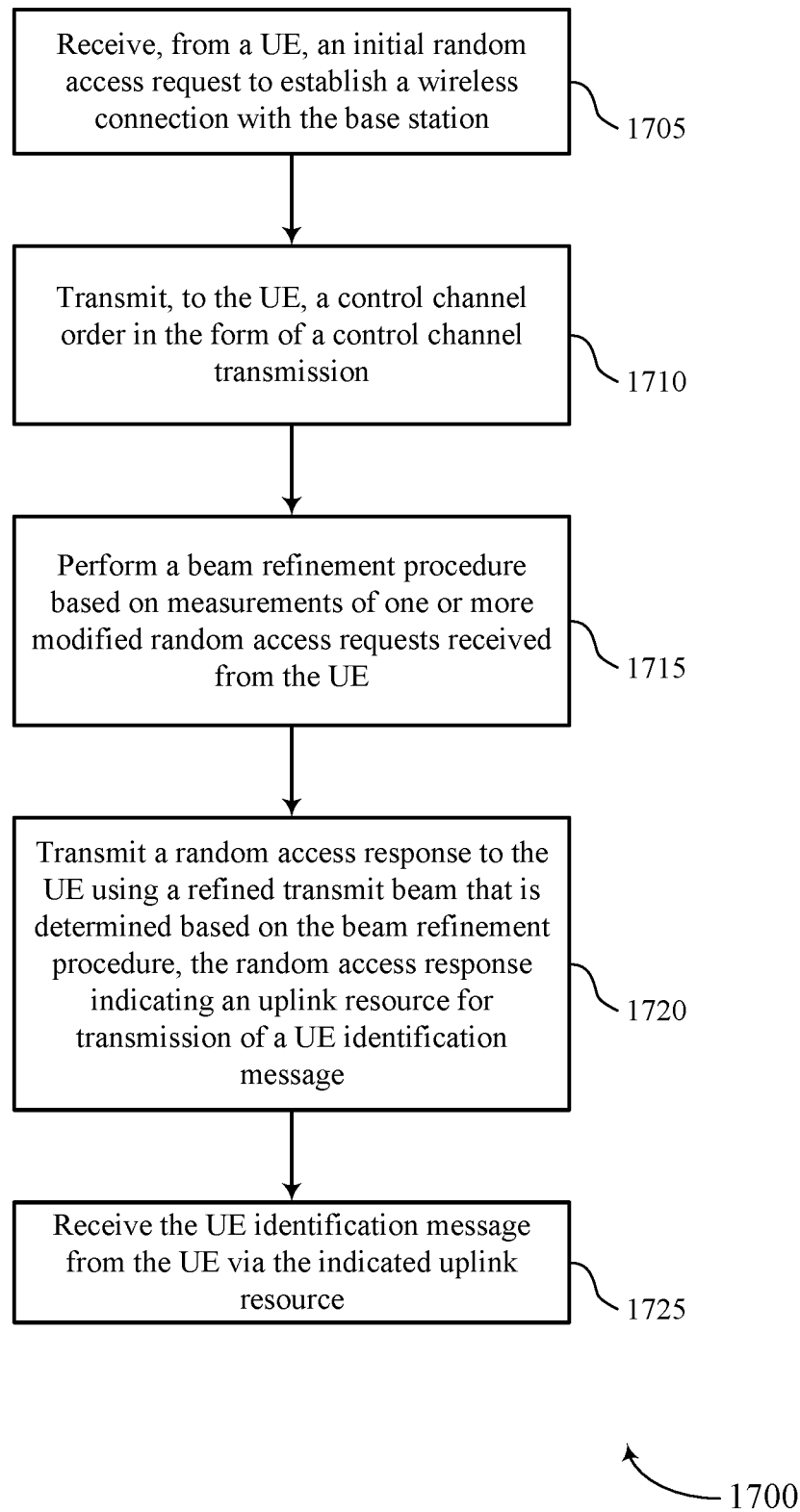

FIG. 17 shows a flowchart illustrating a method 1700 that supports random access with beam refinement in wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an initial random access request to establish a wireless connection with the base station. The operations of 1705 may be performed according to the methods described herein. In some examples, aspects of the operations of 1705 may be performed by a random access manager as described with reference to FIGS. 10 through 13.

At 1710, the base station may transmit, to the UE, a control channel order in the form of a control channel transmission. The operations of 1710 may be performed according to the methods described herein. In some examples, aspects of the operations of 1710 may be performed by a control channel order manager as described with reference to FIGS. 10 through 13.

At 1715, the base station may perform a beam refinement procedure based on measurements of one or more modified random access requests received from the UE responsive to the control channel order. The operations of 1715 may be performed according to the methods described herein. In some examples, aspects of the operations of 1715 may be performed by a beam refinement manager as described with reference to FIGS. 10 through 13.

At 1720, the base station may transmit a random access response to the UE using a refined transmit beam that is determined based on the beam refinement procedure, the random access response indicating an uplink resource for transmission of a UE identification message. The operations of 1720 may be performed according to the methods described herein. In some examples, aspects of the operations of 1720 may be performed by a random access manager as described with reference to FIGS. 10 through 13.

At 1725, the base station may receive the UE identification message from the UE via the indicated uplink resource. The operations of 1725 may be performed according to the methods described herein. In some examples, aspects of the operations of 1725 may be performed by a random access manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a user equipment (UE), comprising: transmitting an initial random access request to a base station to establish a wireless connection with the base station; receiving a control channel order in a form of a control channel transmission from the base station; transmitting one or more modified random access requests to the base station responsive to the control channel order; receiving a random access response from the base station indicating an uplink resource for transmission of a UE identification message; and transmitting the UE identification message to the base station via the indicated uplink resource.

Aspect 2: The method of aspect 1, wherein the receiving the control channel order comprises: monitoring for a control channel message that is scrambled with a random access temporary identifier that corresponds to the initial random access request, and wherein the control channel order indicates a preamble index associated with a random access preamble, and the UE disregards the control channel order when the preamble index does not correspond to a preamble of the initial random access request.

Aspect 3: The method of any of aspects 1 or 2, further comprising: determining, based on the control channel order, uplink resources for the one or more modified random access requests.

Aspect 4: The method of any of aspects 1 through 3, wherein the receiving the control channel order comprises: performing a blind decoding procedure in a common search space based at least in part on the initial random access request.

Aspect 5: The method of any of aspects 1 through 4, further comprising: receiving, prior to receiving the random access response, a second control channel order from the base station; and transmitting, responsive to the second control channel order, a second instance of one or more modified random access requests to the base station.

Aspect 6: The method of any of aspects 1 through 5, wherein the receiving the control channel order further comprises: monitoring for the control channel order using a receive beam that is associated with a synchronization signal block received from the base station, and wherein the control channel order has a higher coding gain than a control channel transmission granting the random access response due to smaller payload size.

Aspect 7: The method of any of aspects 1 through 6, wherein the one or more modified random access requests include one or more repetitions of a preamble sequence of the initial random access request and uses an uplink resource that is indicated by the control channel order, and wherein each of the one or more repetitions is an abbreviated version of the initial random access request.

Aspect 8: The method of any of aspects 1 through 7, further comprising: identifying a first random access occasion for transmitting the initial random access request from a plurality of random access occasions, wherein using the first random access occasion indicates that the UE is to monitor for the control channel order for beam refinement during random access, and wherein a random access request transmitted using a second random access occasion of the plurality of random access occasions indicates that the UE is to monitor for the random access response without monitoring for the control channel order.

Aspect 9: The method of aspect 8, further comprising: selecting the first random access occasion based at least in part on a measurement of one or more channel characteristics of a transmission from the base station.

Aspect 10: The method of aspect 9, wherein the first random access occasion is selected based at least in part on one or more of a measured reference signal strength from the base station being below a signal strength threshold value, one or more other random access request transmissions using the second random access occasion having a transmission power that exceeds a power threshold value, or any combinations thereof.

Aspect 11: The method of any of aspects 1 through 10, wherein the receiving the control channel order further comprises: monitoring for the control channel order during a random access response window that is associated with the initial random access request, and wherein the random access response window is reset responsive to transmitting the one or more modified random access requests.

Aspect 12: The method of any of aspects 1 through 11, wherein the receiving the control channel order further comprises: monitoring for the control channel order during a random access response window that is configured by the base station.

Aspect 13: The method of any of aspects 1 through 12, wherein the receiving the control channel order further comprises: monitoring for the control channel order during a random access response window, wherein a duration of the random access response window is determined based at least in part on a random access occasion used to transmit the initial random access request, a random access preamble of the initial random access request, or any combinations thereof.

Aspect 14: A method for wireless communication at a base station, comprising: receiving, from a user equipment (UE), an initial random access request to establish a wireless connection with the base station; transmitting, to the UE, a control channel order in a form of a control channel transmission; performing a beam refinement procedure based on measurements of one or more modified random access requests received from the UE; transmitting a random access response to the UE using a refined transmit beam that is determined based at least in part on the beam refinement procedure, the random access response indicating an uplink resource for transmission of a UE identification message; and receiving the UE identification message from the UE via the indicated uplink resource.

Aspect 15: The method of aspect 14, wherein the transmitting the control channel order further comprises: scrambling a control channel message with a random access temporary identifier that corresponds to the initial random access request, and wherein the control channel order indicates uplink resources for the one or more modified random access requests.

Aspect 16: The method of any of aspects 14 through 15, further comprising: transmitting, responsive to the one or more modified random access requests, a second control channel order to the UE, and wherein the beam refinement procedure is further based at least in part on measurements of a second modified random access request received from the UE responsive to the second control channel order.

Aspect 17: The method of any of aspects 14 through 16, wherein the transmitting the control channel order comprises: transmitting a first control channel order using a first beam; transmitting, responsive to not detecting the one or more modified random access requests subsequent to the first control channel order, a second control channel order using a second beam, wherein the one or more modified random access requests are received from the UE responsive to the second control channel order; and selecting the second beam as the refined transmit beam.

Aspect 18: The method of any of aspects 14 through 17, wherein the one or more modified random access requests include one or more repetitions of a preamble sequence of the initial random access request and use an uplink resource that is indicated by the control channel order.

Aspect 19: The method of any of aspects 14 through 18, wherein the performing the beam refinement procedure comprises: measuring a first signal strength of the modified random access response using a first receive beam and a second signal strength of the modified random access response using a second receive beam; and selecting the refined transmit beam based at least in part on the first signal strength and the second signal strength.

Aspect 20: The method of any of aspects 14 through 19, further comprising: configuring a plurality of random access occasions for two or more different types of random access, the plurality of random access occasions including a first random access occasion that is configured to provide for beam refinement during random access through the control channel order and the one or more modified random access requests, and a second random access occasion that is configured for random access without beam refinement through transmission of the random access response without transmitting the control channel order or measurements of one or more modified random access requests.

Aspect 21: The method of any of aspects 14 through 20, wherein a random access response window that is associated with the initial random access request is reset responsive to receiving the one or more modified random access requests.

Aspect 22: The method of any of aspects 14 through 21, further comprising: configuring a random access response window duration that is to be used at the UE for monitoring for the control channel order and the random access response.

Aspect 23: The method of any of aspects 14 through 22, wherein a random access response window that is associated with the initial random access request is determined based at least in part on a random access occasion used to transmit the initial random access request, a random access preamble of the initial random access request, or any combinations thereof.

Aspect 24: An apparatus for wireless communication comprising a processor, memory coupled with the processor, the processor and memory configured to cause the apparatus to perform a method of any of aspects 1 through 13.

Aspect 25: An apparatus for wireless communications at a UE, comprising at least one means for performing a method of any of aspects 1 through 13.

Aspect 26: A non-transitory computer-readable medium storing code for wireless communications at a UE, the code comprising instructions executable by a processor to perform a method of any of aspects 1 through 13.

Aspect 27: An apparatus for wireless communication comprising a processor, memory coupled with the processor, the processor and memory configured to cause the apparatus to perform a method of any of aspects 14 through 23.

Aspect 28: An apparatus for wireless communications at a base station, comprising at least one means for performing a method of any of aspects 14 through 23.

Aspect 29: A non-transitory computer-readable medium storing code for wireless communications at a base station, the code comprising instructions executable by a processor to perform a method of any of aspects 14 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting an initial random access request to a base station to establish a wireless connection with the base station;
   receiving a control channel order in a form of a control channel transmission from the base station;

transmitting one or more modified random access requests to the base station responsive to the control channel order;

receiving a random access response from the base station indicating an uplink resource for transmission of a UE identification message; and transmitting the UE identification message to the base station via the indicated uplink resource.

2. The method of claim 1, wherein the receiving the control channel order comprises:

monitoring for a control channel message that is scrambled with a random access temporary identifier that corresponds to the initial random access request, and wherein the control channel order indicates a preamble index associated with a random access preamble, and the UE disregards the control channel order when the preamble index does not correspond to a preamble of the initial random access request.

3. The method of claim 1, further comprising:

determining, based on the control channel order, uplink resources for the one or more modified random access requests.

4. The method of claim 1, wherein the receiving the control channel order comprises:

performing a blind decoding procedure in a common search space based at least in part on the initial random access request.

5. The method of claim 1, further comprising:

receiving, prior to receiving the random access response, a second control channel order from the base station; and transmitting, responsive to the second control channel order, a second instance of one or more modified random access requests to the base station.

6. The method of claim 1, wherein the receiving the control channel order further comprises:

monitoring for the control channel order using a receive beam that is associated with a synchronization signal block received from the base station, and wherein the control channel order has a higher coding gain than a control channel transmission granting the random access response due to smaller payload size.

7. The method of claim 1, wherein the one or more modified random access requests include one or more repetitions of a preamble sequence of the initial random access request and uses an uplink resource that is indicated by the control channel order, and wherein each of the one or more repetitions is an abbreviated version of the initial random access request.

8. The method of claim 1, further comprising:

identifying a first random access occasion for transmitting the initial random access request from a plurality of random access occasions, wherein using the first random access occasion indicates that the UE is to monitor for the control channel order for beam refinement during random access, and wherein a random access request transmitted using a second random access occasion of the plurality of random access occasions indicates that the UE is to monitor for the random access response without monitoring for the control channel order.

9. The method of claim 8, further comprising:

selecting the first random access occasion based at least in part on a measurement of one or more channel characteristics of a transmission from the base station.

10. The method of claim 9, wherein the first random access occasion is selected based at least in part on one or more of a measured reference signal strength from the base station being below a signal strength threshold value, one or more other random access request transmissions using the second random access occasion having a transmission power that exceeds a power threshold value, or any combinations thereof.

11. The method of claim 1, wherein the receiving the control channel order further comprises:

monitoring for the control channel order during a random access response window that is associated with the initial random access request, and wherein the random access response window is reset responsive to transmitting the one or more modified random access requests.

12. The method of claim 1, wherein the receiving the control channel order further comprises:

monitoring for the control channel order during a random access response window that is configured by the base station.

13. The method of claim 1, wherein the receiving the control channel order further comprises:

monitoring for the control channel order during a random access response window, wherein a duration of the random access response window is determined based at least in part on a random access occasion used to transmit the initial random access request, a random access preamble of the initial random access request, or any combinations thereof.

14. A method for wireless communication at a base station, comprising:

receiving, from a user equipment (UE), an initial random access request to establish a wireless connection with the base station;

transmitting, to the UE, a control channel order in a form of a control channel transmission;

performing a beam refinement procedure based on measurements of one or more modified random access requests received from the UE;

transmitting a random access response to the UE using a refined transmit beam that is determined based at least in part on the beam refinement procedure, the random access response indicating an uplink resource for transmission of a UE identification message; and receiving the UE identification message from the UE via the indicated uplink resource.

15. The method of claim 14, wherein the transmitting the control channel order further comprises:

scrambling a control channel message with a random access temporary identifier that corresponds to the initial random access request, and wherein the control channel order indicates uplink resources for the one or more modified random access requests.

16. The method of claim 14, further comprising:

transmitting, responsive to the one or more modified random access requests, a second control channel order to the UE, and wherein the beam refinement procedure is further based at least in part on measurements of a second modified random access request received from the UE responsive to the second control channel order.

17. The method of claim 14, wherein the transmitting the control channel order comprises:

transmitting a first control channel order using a first beam;

transmitting, responsive to not detecting the one or more modified random access requests subsequent to the first control channel order, a second control channel order using a second beam, wherein the one or more modified random access requests are received from the UE responsive to the second control channel order; and selecting the second beam as the refined transmit beam.

18. The method of claim 14, wherein the one or more modified random access requests include one or more repetitions of a preamble sequence of the initial random access request and use an uplink resource that is indicated by the control channel order.

19. The method of claim 14, wherein the performing the beam refinement procedure comprises:

measuring a first signal strength of the modified random access request using a first receive beam and a second signal strength of the modified random access request using a second receive beam; and selecting the refined transmit beam based at least in part on the first signal strength and the second signal strength.

20. The method of claim 14, further comprising:

configuring a plurality of random access occasions for two or more different types of random access, the plurality of random access occasions including a first random access occasion that is configured to provide for beam refinement during random access through the control channel order and the one or more modified random access requests, and a second random access occasion that is configured for random access without beam refinement through transmission of the random access response without transmitting the control channel order or measurements of one or more modified random access requests.

21. The method of claim 14, wherein a random access response window that is associated with the initial random access request is reset responsive to receiving the one or more modified random access requests.

22. The method of claim 14, further comprising:

configuring a random access response window duration that is to be used at the UE for monitoring for the control channel order and the random access response.

23. The method of claim 14, wherein a random access response window that is associated with the initial random access request is determined based at least in part on a random access occasion used to transmit the initial random access request, a random access preamble of the initial random access request, or any combinations thereof.

24. An apparatus for wireless communication at a user equipment (UE), comprising:

a processor, memory coupled with the processor; and instructions stored in the memory and executable by the processor to cause the apparatus to:

transmit an initial random access request to a base station to establish a wireless connection with the base station;

receive a control channel order in a form of a control channel transmission from the base station;

transmit one or more modified random access requests to the base station responsive to the control channel order;

receive a random access response from the base station indicating an uplink resource for transmission of a UE identification message; and transmit the UE identification message to the base station via the indicated uplink resource.

25. The apparatus of claim 24, wherein the instructions are further executable by the processor to cause the apparatus to:

monitor for a control channel message that is scrambled with a random access temporary identifier that corresponds to the initial random access request.

26. The apparatus of claim 24, wherein the instructions are further executable by the processor to cause the apparatus to:

determine, based on the control channel order, uplink resources for the one or more modified random access requests.

27. The apparatus of claim 24, wherein the instructions are further executable by the processor to cause the apparatus to:

identify a first random access occasion for transmitting the initial random access request from a plurality of random access occasions, wherein using the first random access occasion indicates that the UE is to monitor for the control channel order for beam refinement during random access, and wherein a random access request transmitted using a second random access occasion of the plurality of random access occasions indicates that the UE is to monitor for the random access response without monitoring for the control channel order.

28. An apparatus for wireless communication at a base station, comprising:

a processor, memory coupled with the processor; and instructions stored in the memory and executable by the processor to cause the apparatus to:

receive, from a user equipment (UE), an initial random access request to establish a wireless connection with the base station;

transmit, to the UE, a control channel order in a form of a control channel transmission;

perform a beam refinement procedure based on measurements of one or more modified random access requests received from the UE;

transmit a random access response to the UE using a refined transmit beam that is determined based at least in part on the beam refinement procedure, the random access response indicating an uplink resource for transmission of a UE identification message; and receive the UE identification message from the UE via the indicated uplink resource.

29. The apparatus of claim 28, wherein the instructions are further executable by the processor to cause the apparatus to:

transmit, responsive to the one or more modified random access requests, a second control channel order to the UE, and wherein the beam refinement procedure is further based at least in part on measurements of a second modified random access request received from the UE responsive to the second control channel order.

30. The apparatus of claim 28, wherein the instructions are further executable by the processor to cause the apparatus to:

transmit a first control channel order using a first beam;

transmit, responsive to not detecting the one or more modified random access requests subsequent to the first control channel order, a second control channel order using a second beam, wherein the one or more modified random access requests are received from the UE responsive to the second control channel order; and select the second beam as the refined transmit beam.

* * * * *